United States Patent
Momchilov et al.

(10) Patent No.: US 10,671,741 B2
(45) Date of Patent: *Jun. 2, 2020

(54) SHARED SECRET VAULT FOR APPLICATIONS WITH SINGLE SIGN ON

(71) Applicant: Citrix Systems, Inc., Fort Lauderdale, FL (US)

(72) Inventors: Georgy Momchilov, Parkland, FL (US); Ola Nordstrom, Fort Lauderdale, FL (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 19 days.

This patent is subject to a terminal disclaimer.

(21) Appl. No.: 16/032,673

(22) Filed: Jul. 11, 2018

(65) Prior Publication Data

US 2018/0322298 A1    Nov. 8, 2018

Related U.S. Application Data

(63) Continuation of application No. 15/455,751, filed on Mar. 10, 2017, now Pat. No. 10,049,224, which is a
(Continued)

(51) Int. Cl.
*G06F 21/62* (2013.01)
*H04L 29/06* (2006.01)
(Continued)

(52) U.S. Cl.
CPC ........... *G06F 21/62* (2013.01); *G06F 21/41* (2013.01); *G06F 21/78* (2013.01); *H04L 9/0822* (2013.01);
(Continued)

(58) Field of Classification Search
None
See application file for complete search history.

(56) References Cited

U.S. PATENT DOCUMENTS

| 5,200,999 A | 4/1993 | Matyas et al. |
| 5,787,169 A | 7/1998 | Eldridge et al. |

(Continued)

FOREIGN PATENT DOCUMENTS

| JP | H05216409 A | 8/1993 |
| WO | 2008/036947 A2 | 3/2008 |

OTHER PUBLICATIONS

The International Search Report and Written Opinion of The International Searching Authority dated Jun. 1, 2016 corresponding to International Application No. PCT/US2015/068064.
(Continued)

*Primary Examiner* — Benjamin E Lanier
(74) *Attorney, Agent, or Firm* — Banner & Witcoff, Ltd.

(57) ABSTRACT

Some aspects of the disclosure generally relate to providing single sign on features in mobile applications in a secure environment using a shared vault. An application may prompt a user to provide user entropy such as a passcode (e.g. a password and/or PIN). The application may use the user entropy to decrypt a user-entropy-encrypted vault key. Once the vault key is decrypted, the application may decrypt a vault database of the shared vault. The shared vault may store shared secrets, such as server credentials, and an unlock key. The application may store the unlock key, generate an unlock-key-encrypted vault key, and cause the shared vault to store the unlock-key-encrypted vault key, thereby "unlocking" the vault. The application may then use the unlock key to decrypt the vault database without prompting the user to provide user entropy again.

19 Claims, 23 Drawing Sheets

Related U.S. Application Data continuation of application No. 14/983,961, filed on Dec. 30, 2015, now Pat. No. 9,626,525.

(60) Provisional application No. 62/098,457, filed on Dec. 31, 2014.

(51) Int. Cl.
| | |
|---|---|
| *G06F 21/78* | (2013.01) |
| *G06F 21/41* | (2013.01) |
| *H04L 9/08* | (2006.01) |
| *G06F 21/53* | (2013.01) |
| *G06F 21/60* | (2013.01) |
| *H04W 12/06* | (2009.01) |
| *G06F 9/54* | (2006.01) |

(52) U.S. Cl.
CPC .......... *H04L 9/0863* (2013.01); *H04L 63/061* (2013.01); *H04L 63/0861* (2013.01); *G06F 9/544* (2013.01); *G06F 21/53* (2013.01); *G06F 21/602* (2013.01); *H04L 63/083* (2013.01); *H04W 12/0608* (2019.01)

(56) References Cited

U.S. PATENT DOCUMENTS

| | | | |
|---|---|---|---|
| 6,795,920 | B1 | 9/2004 | Bacha et al. |
| 8,613,070 | B1 | 12/2013 | Borzycki et al. |
| 9,413,526 | B1 | 8/2016 | Kothari et al. |
| 9,639,710 | B2 * | 5/2017 | Cooley ............... G06F 21/6218 |
| 9,760,710 | B2 * | 9/2017 | El Khoury ............ H04L 63/083 |
| 2002/0111946 | A1 | 8/2002 | Fallon |
| 2004/0236958 | A1 | 11/2004 | Teicher et al. |
| 2005/0097348 | A1 | 5/2005 | Jakubowski et al. |
| 2006/0085314 | A1 | 4/2006 | Grim et al. |
| 2007/0180515 | A1 | 8/2007 | Danilak |
| 2008/0307020 | A1 * | 12/2008 | Ko ...................... G06F 11/1469 |
| 2010/0088233 | A1 | 4/2010 | Tattan et al. |
| 2011/0113235 | A1 | 5/2011 | Erickson |
| 2011/0246764 | A1 | 10/2011 | Gamez et al. |
| 2011/0270748 | A1 | 11/2011 | Graham, III et al. |
| 2012/0036565 | A1 | 2/2012 | Gamez et al. |
| 2012/0137140 | A1 | 5/2012 | Berengoltz et al. |
| 2013/0191629 | A1 | 7/2013 | Treinen et al. |
| 2014/0164774 | A1 | 6/2014 | Nord et al. |
| 2014/0250511 | A1 | 9/2014 | Kendall |
| 2014/0281571 | A1 | 9/2014 | Federspiel |
| 2015/0039908 | A1 | 2/2015 | Lee et al. |
| 2015/0046330 | A1 | 2/2015 | Hanafi et al. |
| 2015/0178515 | A1 | 6/2015 | Cooley et al. |

OTHER PUBLICATIONS

Dec. 9, 2016—U.S. Notice of Allowance—U.S. Appl. No. 14/983,961.
Aug. 1, 2017—U.S. Non-final Office Action—U.S. Appl. No. 15/455,751.
Jul. 13, 2017—(WO) International Preliminary Report on Patentability—App PCT/US2015/068064.
Dec. 14, 2017—U.S. Final Office Action—U.S. Appl. No. 15/455,751.
Apr. 18, 2018—U.S. Notice of Allowance—U.S. Appl. No. 15/455,751.

* cited by examiner

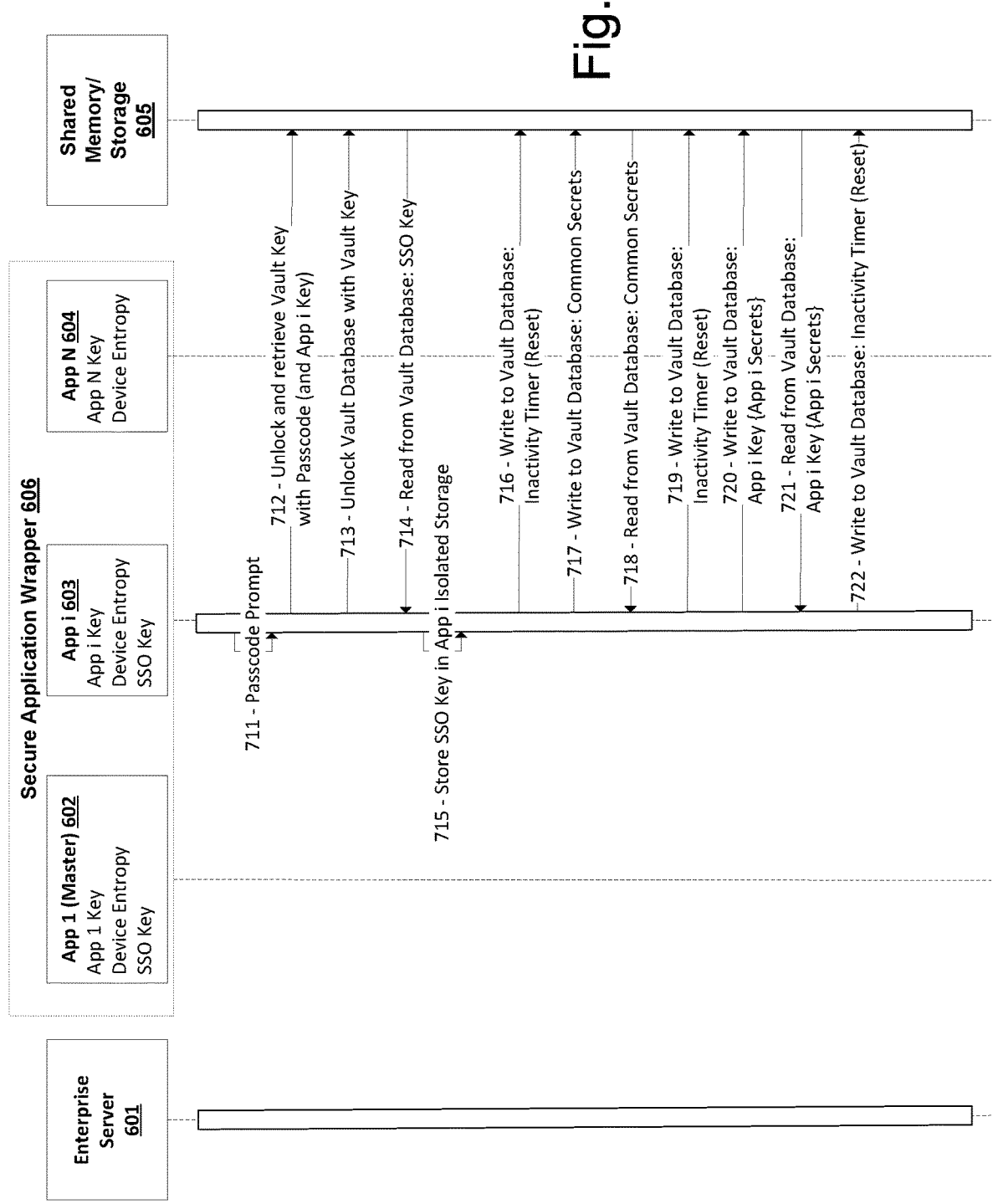

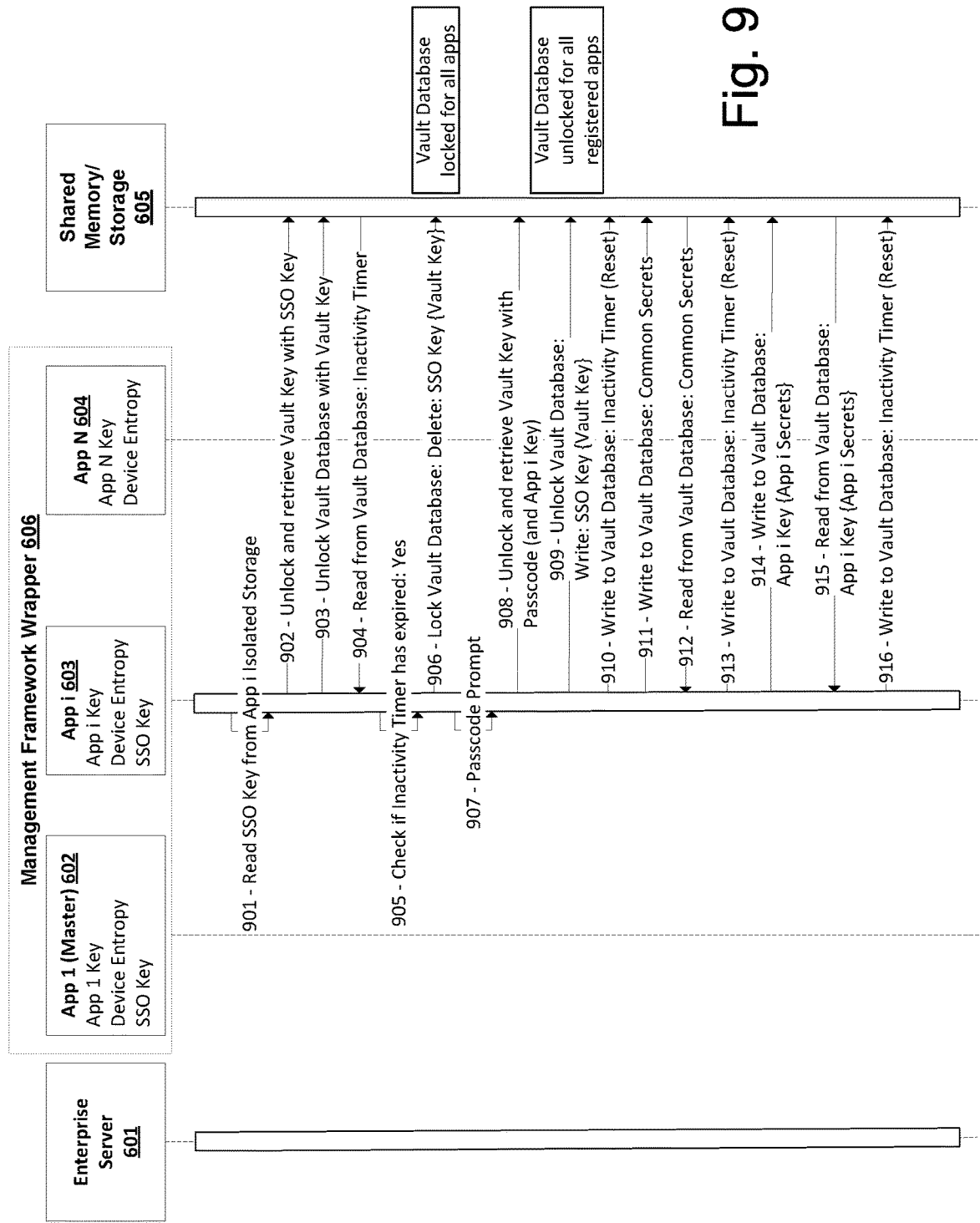

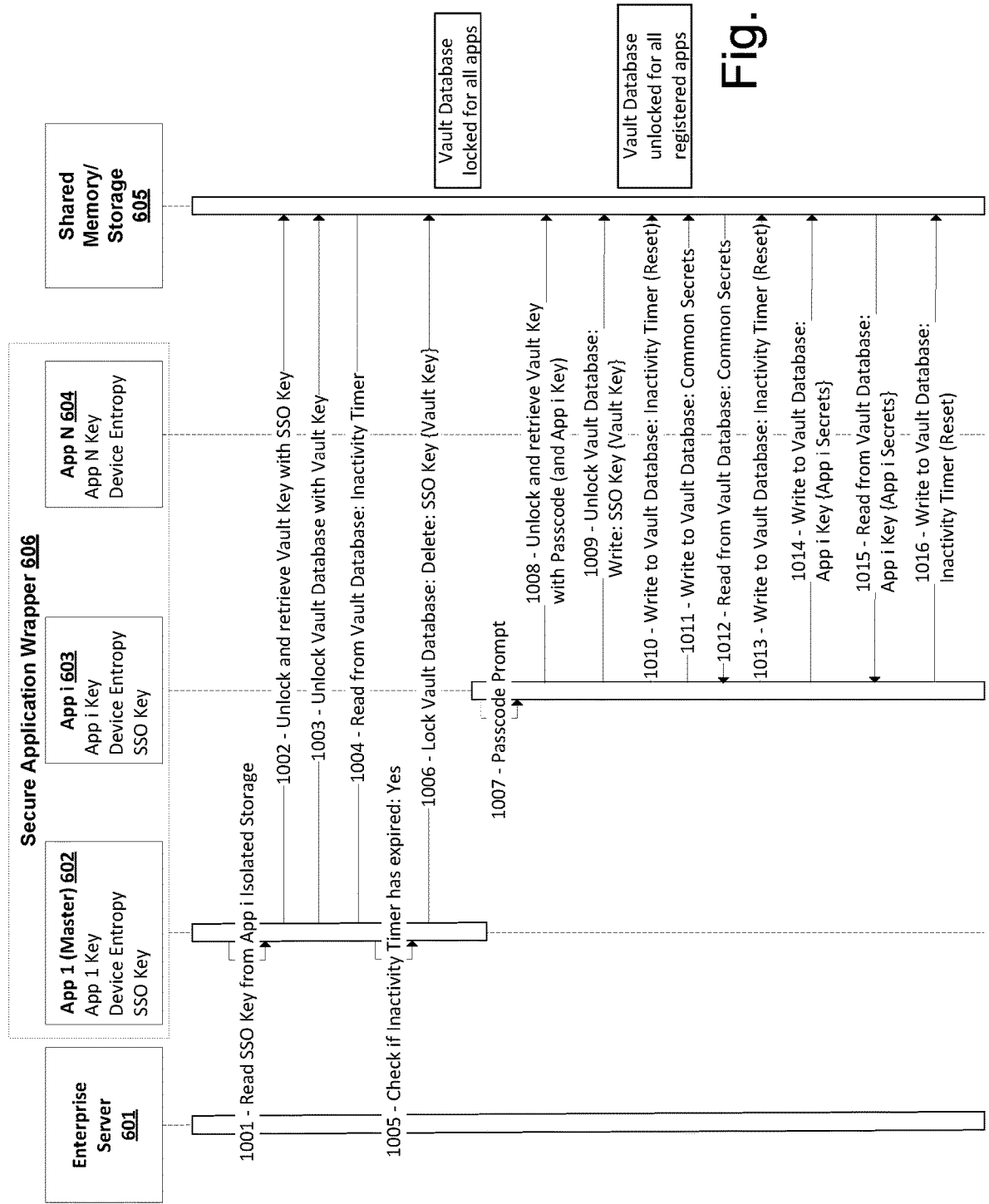

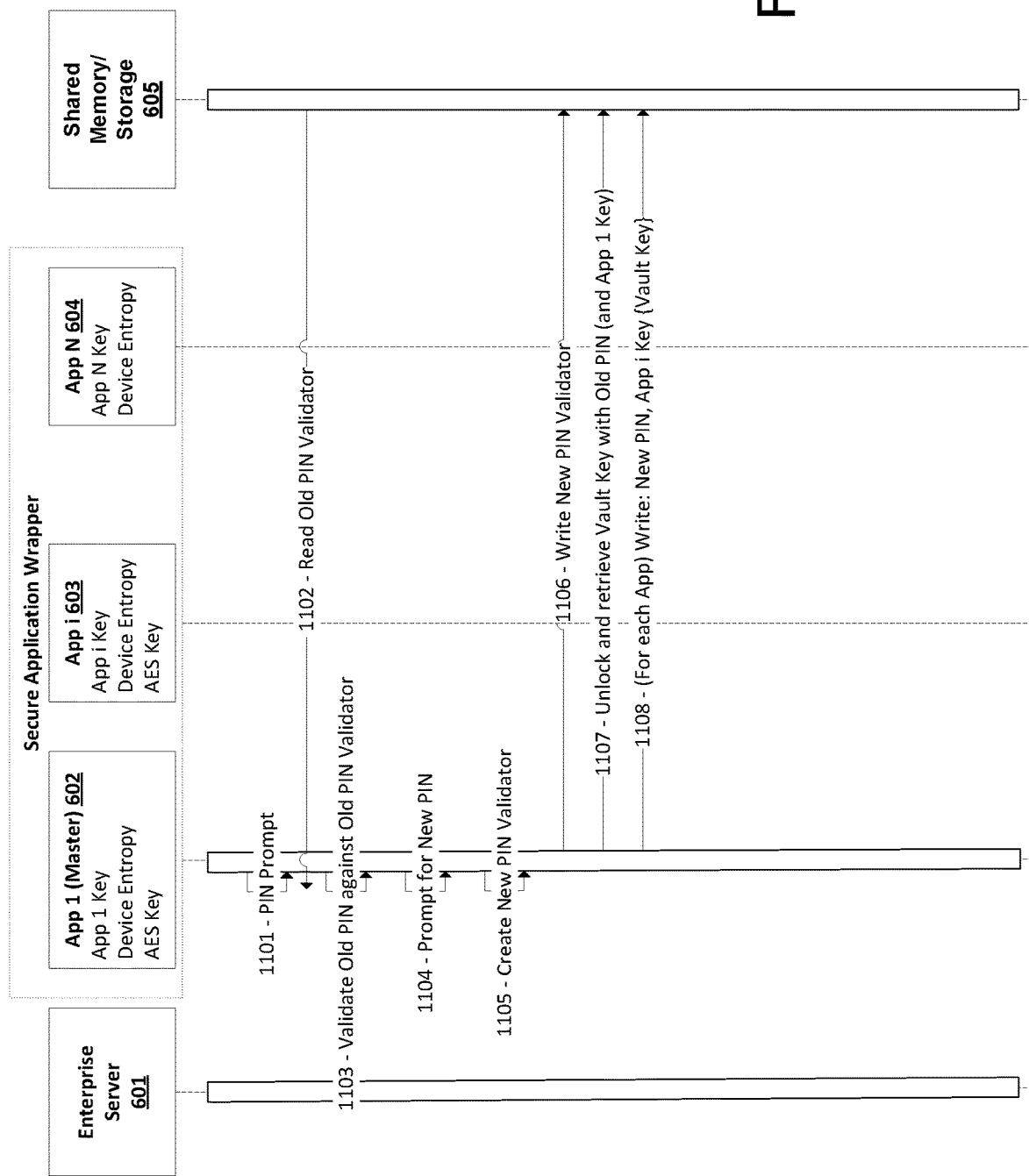

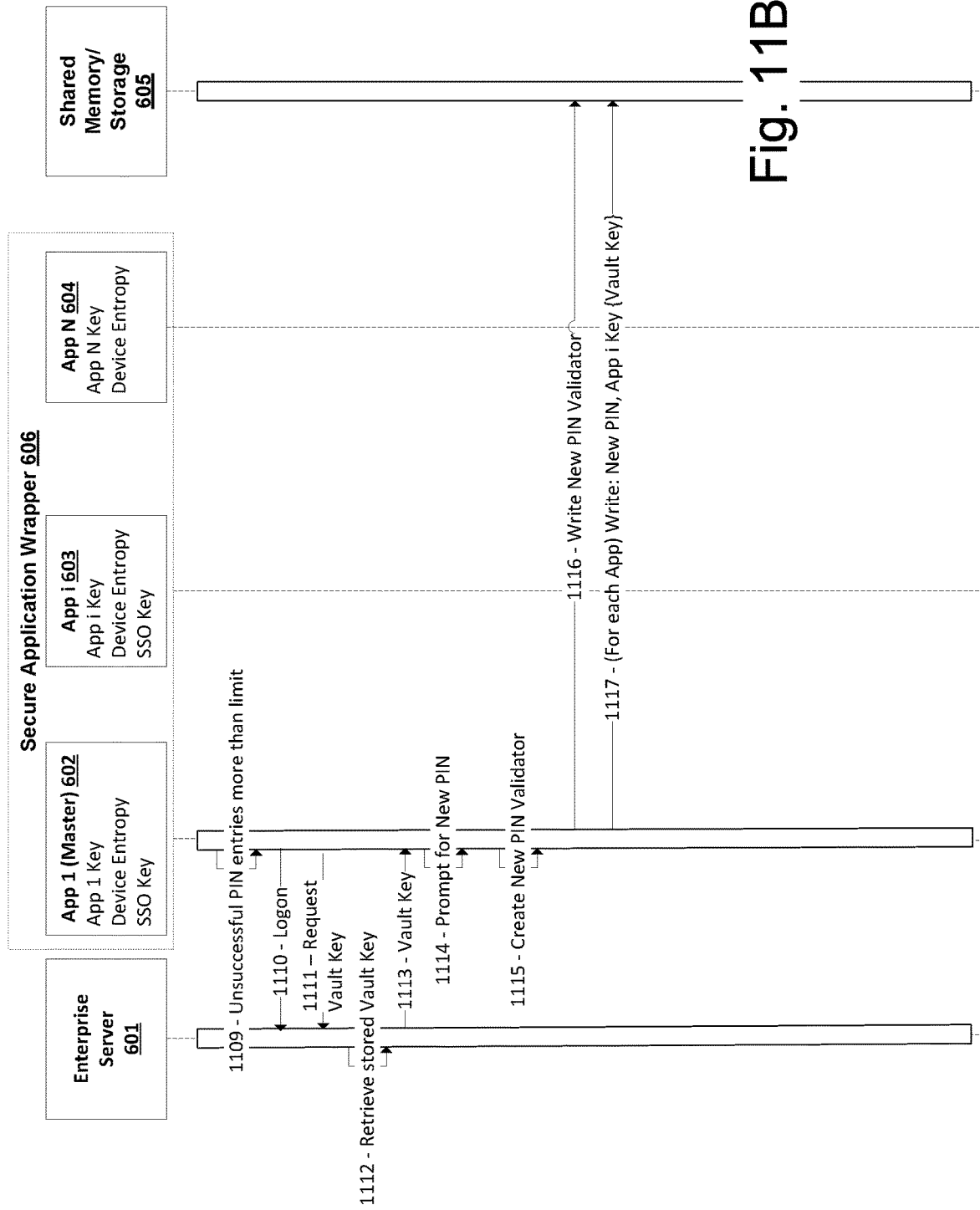

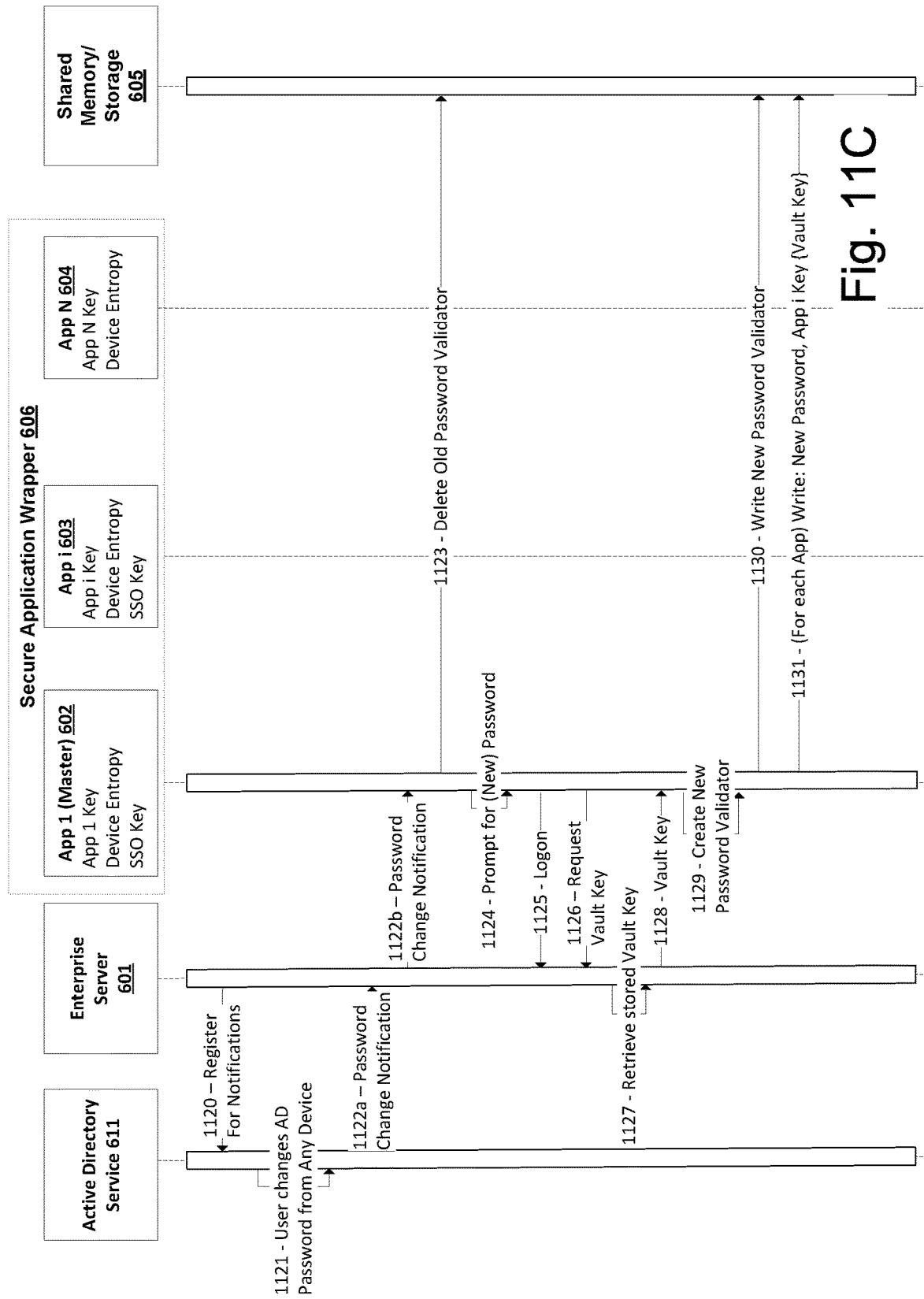

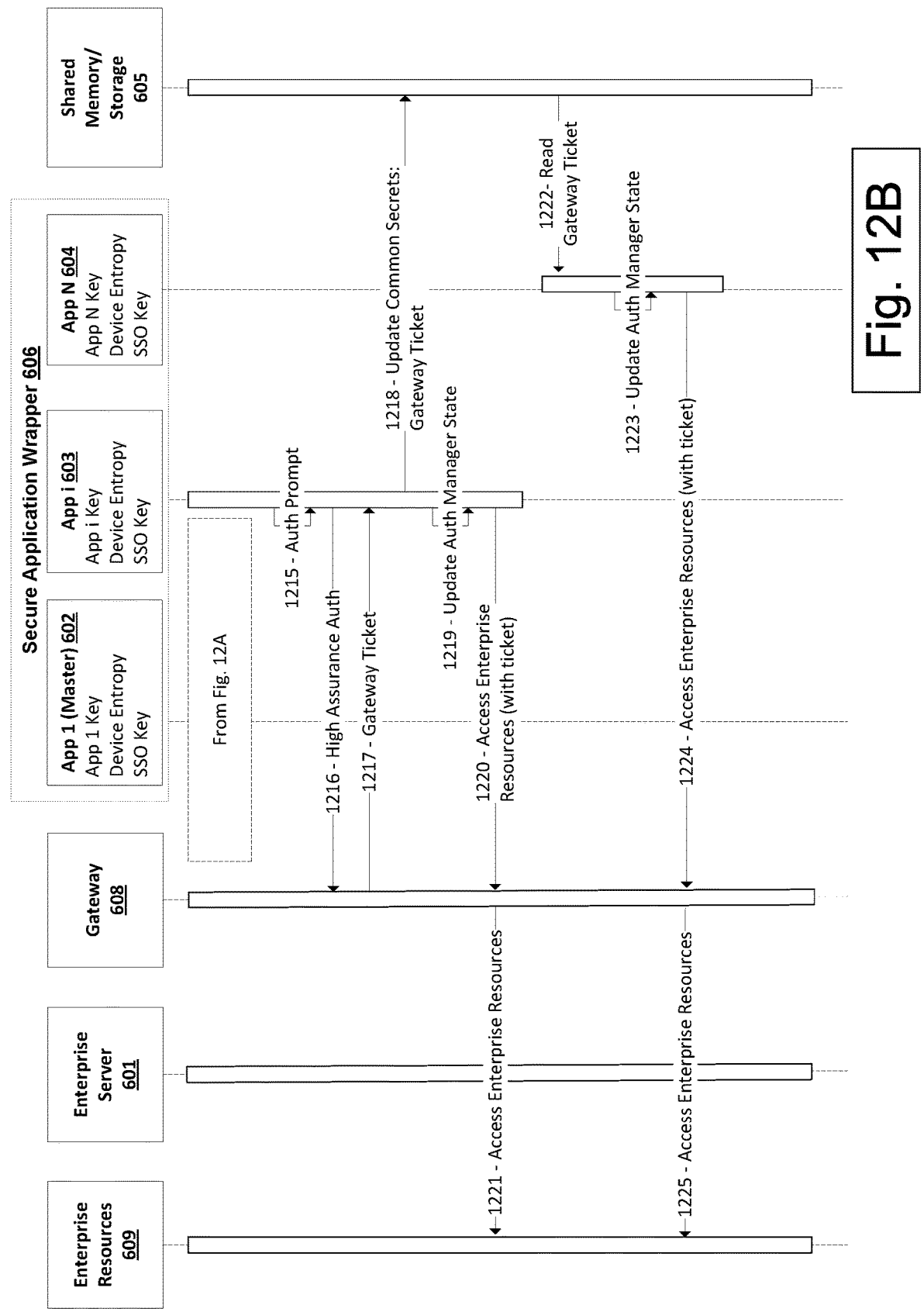

SHARED SECRET VAULT FOR APPLICATIONS WITH SINGLE SIGN ON

CROSS-REFERENCE TO RELATED APPLICATIONS

This application is a continuation of U.S. patent application Ser. No. 15/455,751, entitled "Shared Secret Vault for Applications with Single Sign On" and filed Mar. 10, 2017, which is a continuation of U.S. patent application Ser. No. 14/983,961, entitled "Shared Secret Vault for Applications with Single Sign On" and filed Dec. 30, 2015, which is a non-provisional of and claims priority to U.S. Provisional Patent Application No. 62/098,457, entitled "Shared Secret Vault for Applications with Single Sign On" and filed Dec. 31, 2014, the entirety of which is incorporated herein by reference.

FIELD

Aspects of the disclosure relate to computer hardware and software. In particular, one or more aspects of the disclosure generally relate to providing single sign on (SSO) features in applications using a shared secret vault.

BACKGROUND

Various kinds of computing devices, from personal computers to mobile devices, are becoming increasingly popular. In addition, people are increasingly using these devices for both business purposes and personal uses. As these devices continue to grow in popularity and people continue to use them for an ever-growing number of reasons, the users of these devices have demanded and will continue to demand greater convenience, functionality, and ease-of-use from their computing devices and the computer software with which they interact.

Companies have increasingly turned to mobile devices as a way to provide employees and customers with better access to enterprise services and resources. Users may be able to utilize personal devices to access enterprise resources by providing authentication information in the form of a passcode, such as a password or personal identification number (PIN). However, current systems do not provide suitable means for allowing applications to share authentication state and access to enterprise resources. Instead, current systems may utilize inter-process communication (IPC) via a "master" application to share authentication state between applications. As a result, current systems may present a user with constant context switches, or "flips," between a mobile application and a master application. Upon each context switch, current systems may require that the user enter his passcode once again. Such behaviors may seem random and inexplicable to users, and interfere with a user's uninterrupted access to enterprise resources.

Further, some current systems may implement state sharing via IPC by embedding shared secrets within an application itself. This approach has the disadvantage of being vulnerable to reverse engineering, as an attacker could extract the shared secret from the application.

SUMMARY

Aspects of the disclosure relate to various systems and techniques that provide more flexibility, security, and functionality for managed computing devices and/or computer software, particularly in instances in which one or more mobile applications are provided for accessing enterprise resources. In addition, certain aspects of the disclosure may provide particular advantages when used to share authentication state and shared secrets between authorized mobile applications.

Some aspects of the disclosure generally relate to providing single sign on (SSO) features in mobile applications operating in a secure environment through use of a shared secret vault. According to some aspects of the disclosure, user entropy, application entropy, and/or device entropy may be used to encrypt and/or decrypt the shared vault. Some aspects of the disclosure relate to a secure registration process whereby mobile applications register with the shared vault without relying on direct app-to-app inter-process communication (IPC) or context switches ("flips") between applications. According to some aspects described herein, an application may utilize user entropy (such as a passcode) to unlock the shared vault. The vault may store an unlock key and the application may retrieve the unlock key such that the shared vault may be unlocked at a later time without requiring the user to re-enter user entropy. In the description below, various examples illustrating how a shared vault for mobile applications with single sign on may be provided in accordance with one or more embodiments will be discussed.

Some embodiments described herein may utilize one or more forms of user entropy to unlock a shared vault. While the following discussion generally discusses user entropy as a passcode provided by the user, it should be understood that the techniques and systems described herein may utilize any suitable user-provided values to secure the shared vault and authenticate the user. For example, some embodiments may utilize a personal identification number (PIN) provided by the user. Some embodiments may utilize passwords and/or dynamically generated keys delivered to the user for use in a two-factor authentication process. Some embodiments may utilize Active Directory (AD) passwords. Some embodiments may utilize biometric data as user entropy, such as fingerprints, voice prints, retina scans, and the like. Additionally and/or alternatively, some embodiments may utilize application entropy and/or device entropy, as described further herein, to further increase the security of the shared vault.

In accordance with one or more principles discussed herein, authentication functionality (such as state management and user interface) may be built into applications. The authentication functionality may allow the application to access a shared vault according to the techniques described further herein. The shared vault may enable single sign on features in the applications by providing secure sharing of consistent authentication/logon state information, server credentials, tickets, certificates, timers, and other information used to access secured network resources. Additionally and/or alternatively, the shared vault may allow applications to securely share arbitrary data, for example in the form of binary large objects (BLOBs).

Applications, according to some embodiments described herein, may use user entropy, alone or in combination with application entropy and/or device entropy, to access and unlock a shared secret vault. The user entropy may be used to decrypt a vault key, and the vault key may then be used to unlock the shared secret vault. After the application has accessed and unlocked the vault, the application may retrieve an unlock key for future use in decrypting the vault key without requiring further input of user entropy. The application may generate an unlock-key-encrypted vault key and write this encrypted key to the shared vault for future use in accessing the vault.

According to some embodiments described herein, the system may restrict single sign on features between mobile applications through use of an inactivity timer. The inactivity timer may be used to determine when applications using the shared secret vault have been idle for a specified amount of time, and may cause the system to re-lock the shared secret vault and remove and/or invalidate the unlock-key-encrypted vault key stored in the shared vault. As a result, in some embodiments the application may prompt a user for his passcode (or other user entropy) to continue accessing the shared secret vault.

The inactivity timer may track inactivity on a global, group, per application, or per resource basis, according to some embodiments described herein. Additionally and/or alternatively, the system may be configured based on security and access preferences for the system. For example, the system may provide an interactive mode that tracks inactivity and prompts the user for a passcode after a specified time of inactivity. In some embodiments, the system may provide a hybrid mode where an application prompts the user for a passcode on first use to register with the shared secret vault and does not track inactivity. In such an implementation, the system may prompt the user for a passcode again after a system reboot or other event, if desired. In other embodiments, the system may implement a non-interactive mode where application entropy and/or device entropy are utilized to access and unlock the shared secret vault. In such an implementation, the system may provide single sign on without prompting the user for his passcode or other user entropy in the application.

Use of a shared secret vault, according to some aspects described herein, may enable additional security and authentication features such as virtual smart cards, multiple micro-VPNs on a per application basis, step-up authentication on a per application basis, and secure single sign on in a shared device environment.

Some aspects described herein may provide virtual smart cards in the absence of a trusted platform. Some embodiments may provide the ability to persist a certificate in the shared secret vault coupled with a strong enrollment mechanism. With the certificates securely stored in the shared secret vault, applications may access the certificate/virtual smart card once the user provides his passcode and the application registers with the shared secret vault.

Some aspects described herein may provide multiple micro-VPNs on a per application basis. Micro-VPNs may be used to allow an application to access enterprise resources. However, certain apps may require higher assurance authentication. Some embodiments described herein may enable use of different micro-VPNs by different applications to access different gateways.

Some aspects described herein may provide step-up authentication on a per-application basis. Some enterprise resources may require a higher assurance authentication. In some embodiments, the application may retrieve the higher assurance authorization and store the credentials for the particular resource in application-specific memory rather than in the shared secret vault. As a result, step-up authentication may be provided on a per-application basis while maintaining single sign on features as to other resources.

Some aspects described herein may provide support for multiple users on a shared device. The device may maintain more than one shared vault for the respective users. When a user switch is detected, such as when one user logs off or another user enters their passcode, the device may seamlessly switch contexts to reflect information and credentials associated with the new user.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIG. 7A depicts an example process flow illustrating a registration process with a shared secret vault;

FIG. 9 depicts an example process flow illustrating a lock process based on inactivity in accordance with one or more illustrative aspects discussed herein;

FIG. 10A depicts an example process flow illustrating a lock process based on inactivity in accordance with one or more illustrative aspects discussed herein;

FIG. 11A depicts an example process flow illustrating a PIN update process in accordance with one or more illustrative aspects discussed herein;

FIG. 11B depicts another example process flow illustrating a PIN update process in accordance with one or more illustrative aspects discussed herein;

FIG. 11C depicts an example process flow illustrating a password update process in accordance with one or more illustrative aspects discussed herein;

FIGS. 12A and 12B depict an example process flow illustrating a distributed authentication process in accordance with one or more illustrative aspects discussed herein;

DETAILED DESCRIPTION

Figure 1:
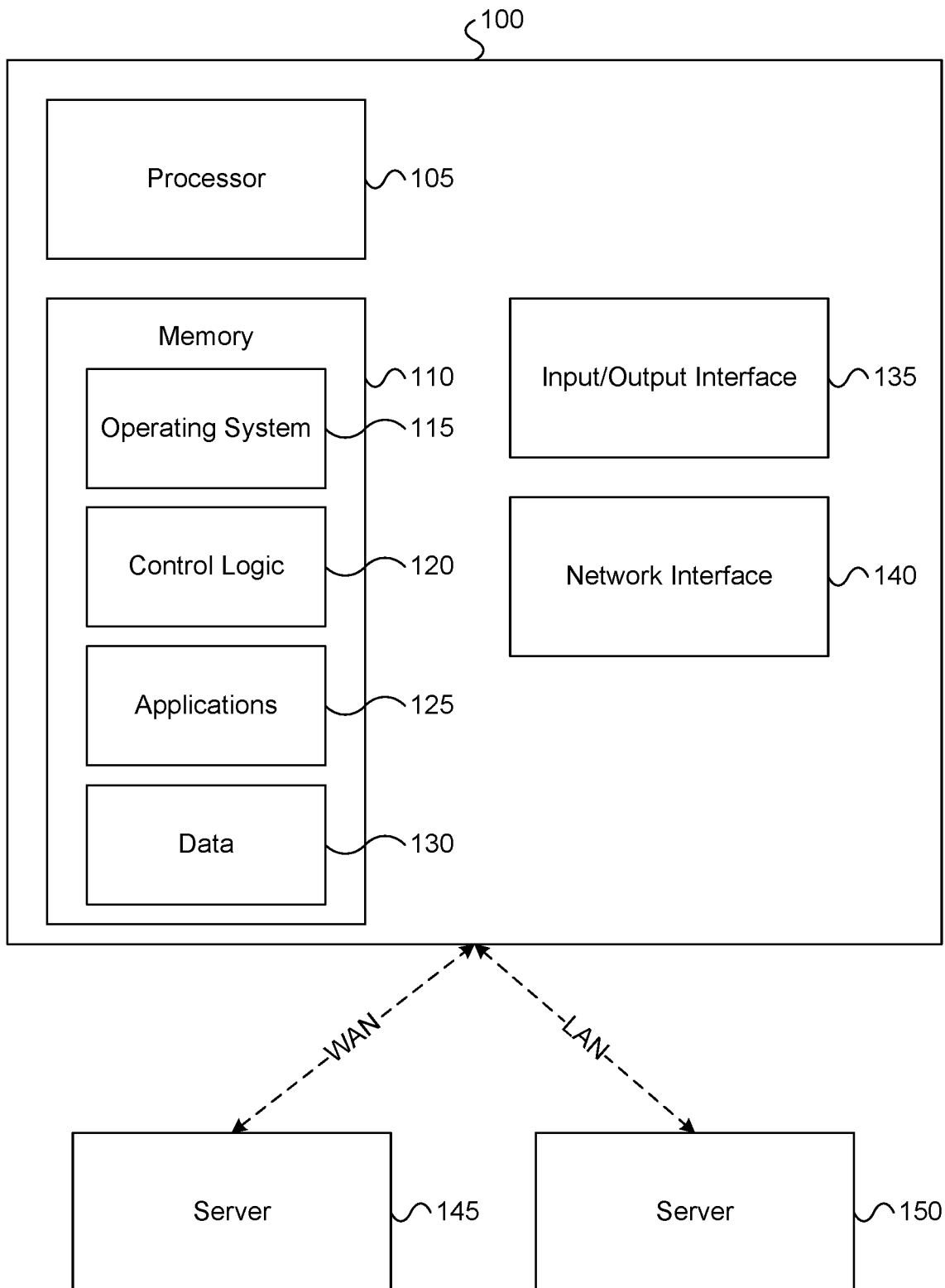
FIG. 1 depicts an example of a computing device that may be used in implementing one or more aspects of the disclosure in accordance with one or more illustrative aspects discussed herein.

In the following description of the various embodiments, reference is made to the accompanying drawings identified above, which form a part hereof, and in which is shown by way of illustration various embodiments in which various aspects of the disclosure may be practiced. Other embodiments may be utilized, and structural and functional modifications may be made, without departing from the scope discussed herein. Various aspects are capable of other embodiments and of being practiced or being carried out in various different ways. In addition, the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof.

As used herein, "entropy" refers to randomness collected by an operating system or application for use in cryptography or other uses that require random data. "User entropy" refers to randomness provided by the user. For example, user entropy may include a passcode set by the user, such as a password or personal identification number (PIN), which may then be used by an application as a key to encrypt/decrypt data directly, or indirectly by encrypting/decrypting data encryption keys. User entropy may serve as an additional protection to application or system/device provided entropy, which may be reversible. In some embodiments, user entropy may not be stored on a device. This may ensure that, even if a device is "rooted" or otherwise hacked, the encrypted data cannot be decrypted without knowledge of the user entropy.

While the following discussion generally discusses user entropy as a passcode provided by the user, it should be understood that the techniques and systems described herein may utilize any suitable user-provided values to secure a shared secret vault and/or authenticate the user. For example, some embodiments may utilize a personal identification number (PIN) provided by the user. Some embodiments may utilize passwords and/or dynamically generated keys delivered to the user for use in a two-factor authentication process. Some embodiments may utilize Active Directory (AD) passwords. Some embodiments may utilize biometric data as user entropy, such as fingerprints, voice prints, retina scans, and the like. Additionally and/or alternatively, some embodiments may utilize application entropy and/or device entropy, as described further herein, to further increase the security of the shared secret vault.

As described herein, some aspects of this disclosure relate to providing single sign on features such as shared authentication state between applications by way of registration with a shared vault secured by a combination of user, application and/or device entropy to protect data and prevent tampering. Before discussing these concepts in greater detail, however, several examples of a computing device that may be used in implementing and/or otherwise providing various aspects of the disclosure will first be discussed with respect to FIG. 1.

FIG. 1 depicts an example of a computing device 100 that may be used in implementing one or more aspects of the disclosure in accordance with one or more illustrative aspects discussed herein. For example, computing device 100 may, in some instances, implement one or more aspects of the disclosure by reading and/or executing instructions and performing one or more actions accordingly. In one or more arrangements, computing device 100 may represent, be incorporated into, and/or include a desktop computer, a computer server, a mobile device (e.g., a laptop computer, a tablet computer, a smart phone, any other type of mobile computing device, etc.), and/or any other type of data processing device. Computing device 100 may, in some instances, operate in a standalone environment. In other instances, computing device 100 may operate in a networked environment. For example, computing device 100 may, in some instances, be connected to and/or otherwise in communication with one or more other computing devices that may be local to and/or physically remote from computing device 100.

As seen in FIG. 1, computing device 100 may, in some embodiments, include a processor 105, memory 110, an input/output interface 135, and a network interface 140. These are only some examples of the components and/or subsystems that may be included in computing device 100 in some embodiments. In other embodiments, computing device 100 may include two or more of any and/or all of these components (e.g., two or more processors, two or more memories, etc.) and/or other components and/or subsystems not listed here.

In some embodiments, processor 105 may control overall operation of computing device 100, including operation of one or more of the other components included in computing device 100, such as memory 110, input/output interface 135, and/or network interface 140. Memory 110 may, for instance, store software, instructions, data, and/or other information. For example, software may be stored in memory 110 and/or other storage to provide instructions to processor 105 for configuring the computing device 100 into a special purpose computing device in order to perform one or more of the various functions discussed herein.

In some arrangements, memory 110 may store, provide, and/or otherwise include an operating system 115, control logic 120, one or more applications 125, and/or data 130. Operating system 115 may, for example, control overall operation of computing device 100. Control logic 120 may, for instance, instruct computing device 100 and/or various components included therein, including processor 105, to perform and/or otherwise provide various aspects of the disclosure. The one or more applications 125 may, for example, provide secondary, support, and/or other functionalities that may be used in conjunction with various aspects of the disclosure. Additionally, data 130 may, for instance, be used in performing one or more aspects of the disclosure and, in some instances, may include one or more databases, data tables, and/or the like.

In some arrangements, input/output interface 135 may include a keyboard, mouse, display, printer, scanner, optical reader, stylus, and/or one or more other components. For example, input/output interface 135 may include various interface units and/or drives for reading, writing, displaying, and/or printing files and/or other data. In some embodiments, input/output interface 135 may include an audio interface that includes one or more microphones for capturing audio input and/or one or more speakers for providing audio output. Additionally or alternatively, input/output interface 135 may include a video display device for providing textual, audiovisual, and/or graphical output.

In some embodiments, at least one display included in and/or otherwise provided by input/output interface 135 may be a touch-sensitive display screen (also known as a "touch screen"). Such a touch screen may, for instance, be configured to display graphical content rendered and/or otherwise generated by computing device 100. In addition, the touch screen may be configured to receive user input from a user of computing device 100, including touch-based user input provided by the user using a stylus, finger, or other pointing aspect that is operated, controlled, and/or otherwise used by the user of the computing device 100 to interact with the touch screen.

As indicated above, computing device 100 may, in some instances, operate in a networked environment supporting connections to one or more remote computers, servers, and/or devices. Such connectivity may, in some embodiments, be provided by network interface 140. For example, network interface 140 may include one or more communication interfaces, ports, adapters, antennas, and/or other elements to facilitate various network connections. Such network connections may include local area network (LAN) connections, wide area network (WAN) connections (e.g., to the Internet), and/or any other types of connections. In some arrangements, LAN connections may be established and/or provided via a dedicated LAN interface and/or adapter, and/or WAN connections may be established and/or provided via a dedicated WAN interface and/or adapter. Other connections may, for example, be established and/or provided via other communication interfaces, such as wired communication interfaces (e.g., Ethernet), wireless communication interfaces (e.g., wireless LAN (WLAN), cellular, Bluetooth, etc.), and/or other communication interfaces.

As seen in FIG. 1, computing device 100 may, in some instances, be connected to and/or in communication with one or more servers, such as server 145 and server 150. Such servers may, for instance, implement one or more aspects of computing device 100 and, accordingly, may include one or more processors, memories, and/or the like. Some connections to the one or more servers may be established via a LAN (e.g., the connection between computing device 100 and server 145), while other connections to the one or more servers may be established via a WAN (e.g., the connection between computing device 100 and server 150). In some embodiments, some or all of the one or more servers may be virtual servers that are provided by software being executed on one or more computing devices.

In addition, one or more aspects of the disclosure may be embodied in computer-usable or readable data and/or computer-executable instructions, such as in one or more program modules, executed by one or more computers or other devices as discussed herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HTML or XML. The computer executable instructions may be stored on a computer readable medium such as a nonvolatile storage device.

Any suitable computer readable storage media may be utilized, including hard disks, CD-ROMs, optical storage devices, magnetic storage devices, and/or any combination thereof. In addition, various transmission (non-storage) media representing data or events as discussed herein may be transferred between a source and a destination in the form of electromagnetic waves traveling through signal-conducting media such as metal wires, optical fibers, and/or wireless transmission media (e.g., air and/or space). Various aspects discussed herein may be embodied as a method, a data processing system, or a computer program product. Therefore, various functionality may be embodied in whole or in part in software, firmware, and/or hardware or hardware equivalents such as integrated circuits, field programmable gate arrays (FPGA), and the like. Particular data structures may be used to more effectively implement one or more aspects of the disclosure, and such data structures are contemplated as being within the scope of computer executable instructions and computer-usable data discussed herein.

Further, some aspects of the disclosure may also be operational with numerous other general purpose or special purpose computing system environments or configurations. Examples of other computing systems, environments, and/or configurations that may be suitable for use with aspects discussed herein include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

Having discussed several examples of computing devices that may be used in providing and/or implementing various aspects of the disclosure, an example mobile device and operating environment will now be discussed in greater detail. In particular, and as introduced above, some aspects of the disclosure generally relate to providing single sign on features in mobile applications in a secure environment using a shared vault. Some aspects of the disclosure relate to an application prompting a user to provide user entropy such as a password and/or PIN, both generally referred to as passcode. The application may use the user entropy to decrypt a user-entropy-encrypted vault key. Once the vault key is decrypted, the application may decrypt a vault database of the shared vault. The shared vault may store shared secrets, such as server credentials, and an unlock key. The application may store the unlock key, generate an unlock-key-encrypted vault key, and cause the shared vault to store the unlock-key-encrypted vault key, thereby "unlocking" the vault. The application may then use the unlock key to decrypt the vault database without prompting the user to provide user entropy again. In some embodiments, the system may track an inactivity timer and remove and/or invalidate the unlock-key-encrypted vault key after a specified period of inactivity, thereby "locking" the shared vault. After a period of inactivity, the application may prompt the user to enter user entropy, unlock the vault, and restore the unlock-key-encrypted vault key. In the description below, various examples illustrating a shared vault in accordance with one or more embodiments will be discussed.

Figure 2:
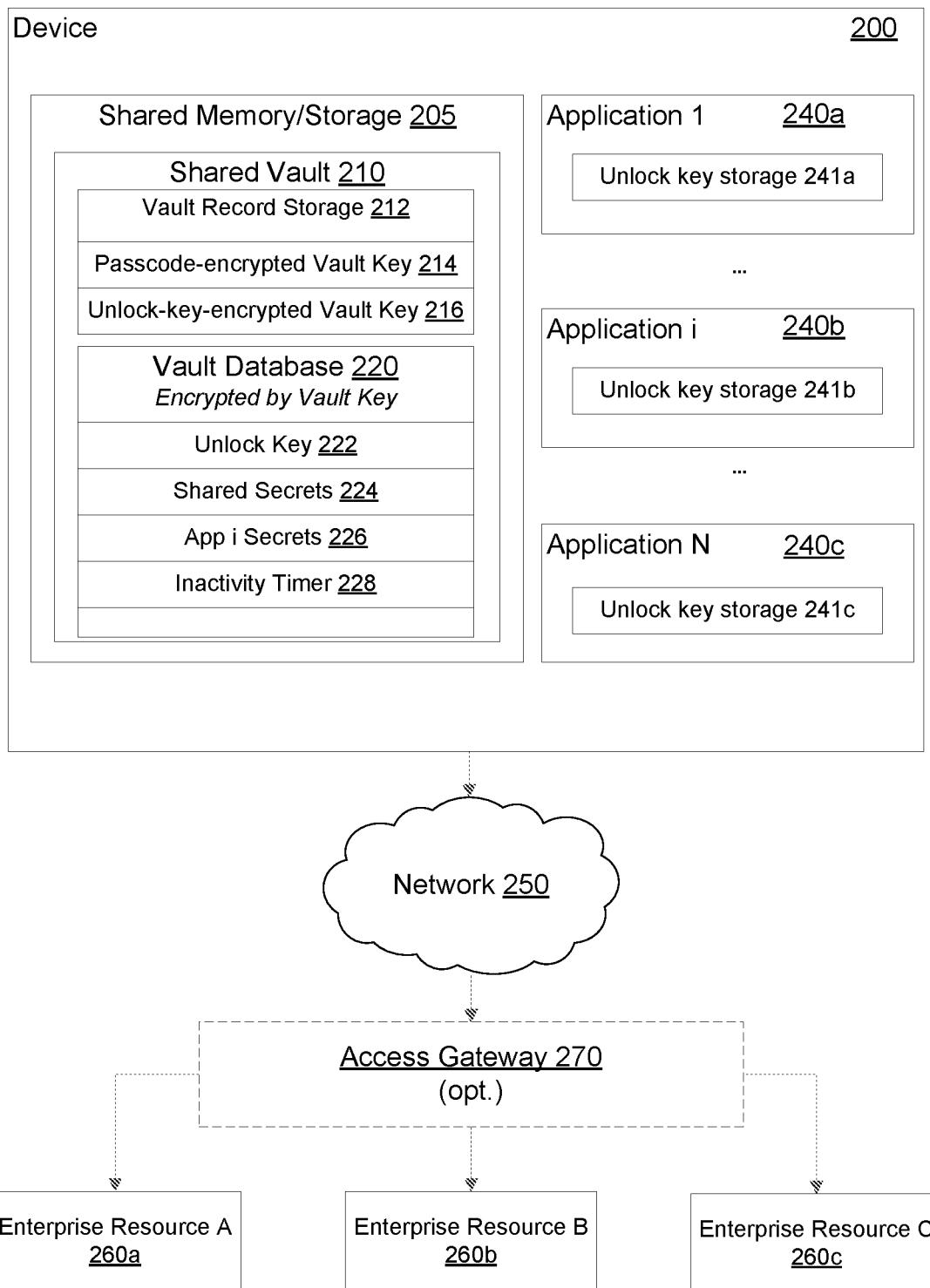
FIG. 2 depicts an illustrative device and logical memory structure that may be used in implementing one or more aspects of the disclosure in accordance with one or more illustrative aspects discussed herein.

FIG. 2 illustrates an example operating environment including a mobile device 200, logical memory structures that may be stored thereon, and enterprise resources 260 that may be accessed according to one or more aspects disclosed herein. Mobile device 200 may be a computing device such as computing device 100, and may include a memory storing instructions and data and a processor operable to execute the stored instruction. Mobile device 200 may have one or more applications installed thereon, such as application 1 240a, application i 240b, and/or application N 240c (collectively applications 240). According to some aspects described herein, applications 240 may access a shared vault 210 stored in shared memory 205 (and/or shared storage 205) to retrieve shared secrets 224. Applications 240 may use shared secrets 224 to access secured resources, such as enterprise resource A 260a, enterprise resource B 260b, and enterprise resource C 260c (collectively enterprise resources 260) over a network 250. The network 250 may, for example, be any suitable wired and/or wireless network, or combination thereof. For example, the mobile device may access enterprise resources 260 over the internet. Although discussed in the context of mobile device 200, the methods and techniques described herein may be implemented in any suitable computing device.

Mobile device 200 may run an iOS operating system, an Android operating system, or the like. Applications 240 may include email applications, web browsing applications, software-as-a-service (SaaS) access applications, Windows Application access applications, and the like. Applications 240 may be native applications, remote applications executed by an application launcher, virtualization applications executed by an application launcher, and the like. One or more of the applications may be wrapped by a secure application wrapper. The secure application wrapper may include integrated policies that are executed on the mobile device when the application is executed on the device. The secure application wrapper may include meta-data that points the application running on the mobile device to the resources and other metadata hosted at the enterprise that the application may require to complete the task requested upon execution of the application. Applications 240 may utilize resources on mobile device 200, at enterprise resources 260, and the like. The resources used on the mobile device may include user interaction resources, processing resources, and the like. The user interaction resources may be used to collect and process keyboard input, mouse input, camera input, tactile input, audio input, visual input, gesture input, and the like. The processing resources may be used to present a user interface, process data received from the user interaction resources, enterprise resources 260, and the like. The resources used at the enterprise resources 260 by the applications 240 may include user interface generation resources, processing resources, and the like. The user interface generation resources of the enterprise resources 260 may be used to assemble a user interface, modify a user interface, refresh a user interface, and the like. The processing resources of the enterprise resource 260 may be used to create information, read information, update information, delete information, and the like.

The mobile device 200 may connect to enterprise resources 260 at an enterprise through the network 250. In some embodiments, the mobile device may connect to enterprise resources 260 through virtual private network connections. The virtual private network connections, also referred to as microVPN or application-specific VPN, may be specific to particular applications 240, particular devices, particular secured areas on the mobile device, and the like. For example, each of the applications may access enterprise resources through an application and/or resource specific VPN such that access to the VPN would be granted based on attributes associated with the application, possibly in conjunction with user or device attribute information. Access may be further conditioned on server credentials and/or other information stored in shared secrets 224. The virtual private network connections may carry Microsoft Exchange traffic, Microsoft Active Directory traffic, HyperText Transfer Protocol (HTTP) traffic, HyperText Transfer Protocol Secure (HTTPS) traffic, application management traffic, and the like.

The virtual private network connections may be established and managed by an access gateway 270, in some embodiments. The access gateway 270 may include performance enhancement features that manage, accelerate, and improve the delivery of enterprise resources 260 to the mobile device 200. The access gateway 270 may also re-route traffic from the mobile device 200 to the public Internet, enabling the mobile device 200 to access publicly available and unsecured applications that run on the public Internet. The mobile device 200 may connect to the access gateway 270 via network 250. Network 250 may be a wired network, wireless network, cloud network, local area network, metropolitan area network, wide area network, public network, private network, and the like.

The enterprise resources 260 may include email servers, file sharing servers, SaaS applications, Web application servers, Windows application servers, and the like. Email servers may include Exchange servers, Lotus Notes servers, and the like. File sharing servers may include ShareFile servers, and the like. SaaS applications may include Salesforce, and the like. Windows application servers may include any application server that is built to provide applications that are intended to run on a local Windows operating system, and the like. The enterprise resources 260 may be premise-based resources, cloud based resources, and the like. The enterprise resources 260 may be accessed by the mobile device 200 directly or through the access gateway 270.

The enterprise resources 260 may provide enterprise services such as authentication services, threat detection services, device manager services, file sharing services, policy manager services, social integration services, application controller services, and the like. Authentication services may include user authentication services, device authentication services, application authentication services, data authentication services and the like. Authentication services may use certificates. The certificates may be stored on the mobile device 200, by the enterprise resources 260, and the like. The certificates stored on the mobile device 200 may be stored in the shared vault 210 as shared secrets 224 in the encrypted vault database 220 for use by applications that have registered with the shared vault, as described herein. Threat detection services may include intrusion detection services, unauthorized access attempt detection services, and the like. Unauthorized access attempt detection services may include unauthorized attempts to access devices, applications, data, and the like. Device management services may include configuration, provisioning, security, support, monitoring, reporting, and decommissioning services. File sharing services may include file management services, file storage services, file collaboration services, and the like. Policy manager services may include device policy manager services, application policy manager services, data policy manager services, and the like. Social integration services may include contact integration services, collaboration services, integration with social networks such as Facebook, Twitter, and LinkedIn, and the like. Application controller services may include management services, provisioning services, deployment services, assignment services, revocation services, wrapping services, and the like.

Mobile device 200 may include shared memory/storage 205. The shared storage may be unsecured and accessible by any application executing on mobile device 200. The shared storage may include one or more shared vaults 210, each of which in turn may include vault record storage 212 and vault database 220. The data stored in the vault database 220 may include files, databases, and the like. The vault database 220 may include shared secrets 224 that, according to some aspects, may enable applications 240 to access enterprise resources 260 and exchange arbitrary data. The data stored in the vault database 220 may include data restricted to a specific application, shared among applications 240, shared among a group of applications, and the like. The vault database 220 may be encrypted using a vault key, and applications may be unable to access data stored in the vault database without possessing the vault key. The vault database 220 may be encrypted using a strong form of encryption such as Advanced Encryption Standard (AES) 128-bit encryption or the like. While AES is used as an example encryption standard herein, it should be understood that any suitable encryption method or standard may be used to secure shared vault 210.

Vault record storage 212 may store vault key information used to unlock the encrypted vault database 220. The vault key information may be accessible to applications 240. However, the vault key information may be encrypted and may not be used to decrypt the vault database 220 until the vault key itself is decrypted. The vault record storage may store a passcode-encrypted vault key 214. Although examples in this disclosure generally describe using a user-provided passcode (e.g., PIN or password) as user entropy for encrypting the vault key, it should be understood that any suitable user entropy may be utilized. For example, in some embodiments the vault key may be encrypted using a password, such as an Active Dictionary password, and/or biometric data associated with the user, and the like.

An application may prompt a user to input user entropy data (such as a passcode) before the application is able to access the data stored in the encrypted vault database 220. The application may access the passcode-encrypted vault key 214 stored in the vault record storage 212 and decrypt the passcode-encrypted vault key 214 to generate the vault key. The generated vault key may then be used by the application to decrypt the encrypted vault database 220. The application may avoid storing and/or may be prevented from storing the user entropy data and the decrypted vault key. As described further herein, in some embodiments the vault key may be further encrypted using application entropy and/or device entropy, and the application may require additional information beyond the user entropy to fully decrypt the vault key. However, for the sake of simplicity, FIG. 2 does not illustrate application entropy and/or device entropy.

Once the application has decrypted the vault database 220, the application may access shared secrets 224 as well as application specific secrets, such as application i secrets 226. The shared secrets 224 may include authentication/logon state information, server credentials, tickets (such as long-lived server access credentials), certificates, timers, and other information used to access secured network resources. Additionally and/or alternatively, the shared vault may allow applications to securely share arbitrary data, for example in the form of binary large objects (BLOBs). In some embodiments, access to application specific secrets may be limited to a respective application that owns or is associated with those secrets. This may be accomplished, for example, by way of access policies and/or encryption using application entropy.

The vault database 220 may also store an unlock key 222. In some embodiments, described further below, the unlock key 222 may be an AES key used to decrypt the unlock-key-encrypted vault key 216. The unlock key 222 may also be referred to as Single Sign On (SSO) key. The unlock-key-encrypted vault key 216 may also be referred to as SSO record. Once the application has decrypted the vault database 220, the application may read the unlock key 222 from the vault database 220 and store the unlock key 222 in application-specific unlock key storage 241*a-c*, respectively. The unlock key storage 241*a-c* may be application-specific in the sense that it is stored in a portion of the memory or storage provided by mobile device 200 and reserved and/or isolated for applications 240*a-c*, respectively. Other applications may be unable to access unlock key storage 241*a-c*. After retrieving the unlock key 222, the application may check whether the vault record storage 212 includes an unlock-key-encrypted vault key 216. If the vault record storage 212 includes the unlock-key-encrypted vault key 216, then the shared vault is in an unlocked state and the application may use the unlock key to access the shared vault in the future without prompting the user to enter his passcode again (provided the vault is in an unlocked state, as described further herein). If the vault record storage 212 does not include the unlock-key-encrypted vault key 216, the application may use the unlock key 222, and the decrypted vault key, to generate an unlock-key-encrypted vault key 216 and cause it to be stored in the vault record storage 212. In some embodiments, the unlock-key-encrypted vault key 216 is generated in response to and/or as a result of decrypting the vault database with user entropy (passcode). As a result, any application that has stored the unlock key in its respective unlock key storage may access the vault without prompting the user to enter his passcode (provided the vault is in an unlocked state).

The vault database 220 may also store an inactivity timer 228, in some embodiments. An application that has decrypted the vault database 220 may read the inactivity timer and determine if a specified period of inactivity has occurred. The inactivity timer may track an elapsed time since the shared vault was last decrypted using the passcode and/or the unlock key. The mobile device 200, the applications 240, and/or the shared vault 210 may be configured to "lock" the shared vault after a specified period of inactivity. The period may be a configurable time limit associated with and/or set by one or more security policies of mobile device 200, enterprise resources 260, applications 240, and/or shared vault 210. When an application determines that a specified amount of time has elapsed since the shared vault was last decrypted, the application may cause the unlock-key-encrypted vault key 216 to be deleted or otherwise removed from vault record storage 212, thereby "locking" the shared vault 210 and vault database 220. The application may then require that a user provide user entropy such as a passcode number before the vault database 220 may be decrypted again. By deleting the unlock-key-encrypted vault key 216, applications 240 may be unable to decrypt the vault database 220 without prompting the user to provide his passcode, according to some aspects described herein. The unlock key stored by the applications may not be used to decrypt the passcode-encrypted vault key 214, and the applications may not be able to access the encrypted vault database 220 until the shared vault is "unlocked" by re-entry of user entropy information, decryption of the passcode-encrypted vault key 214, and re-creation of the unlock-key-encrypted vault key 216 for storage in vault record storage 212.

The mobile device 200 may include both persistent and volatile storage. Volatile storage, such as random access memory (RAM) and the like, may be erased when mobile device 200 is turned off, loses power, or is rebooted. Persistent storage, such as flash memory or hard disk storage and the like, may retain stored information even if it loses power. In some embodiments, shared memory/storage 205 and unlock key storage 241a-c may be implemented using both the persistent and volatile storage. Each of the shared vault 210, vault record storage 212, passcode-encrypted vault key 214, unlock-key-encrypted vault key 216, vault database 220, unlock key 222, shared secrets 225, application i secrets 226, and/or unlock key storage 241a-c may be stored in any combination of persistent memory and volatile memory as desired in a particular embodiment.

For example, in some embodiments the vault database 220 and the passcode-encrypted vault key 214 may be stored in persistent storage while the unlock-key-encrypted vault key 216 and the unlock key storage 241a-c may be stored in volatile memory. As a result, on loss of power or reboot the unlock keys stored by the applications will be lost and each application may need to prompt the user to enter his passcode to re-register the application with the shared vault 210 and acquire the unlock key 222. In other embodiments, the unlock key storage 241a-c may be stored in persistent memory such that a user may not need to re-register applications every time the mobile device 200 is restarted. However, by storing the unlock-key-encrypted vault key 214 in volatile memory, the user may be required to provide his passcode to at least one application before each registered application (that has the unlock key) may access the encrypted vault database 220 after a loss of power and/or reboot.

In some embodiments, the vault database 220 and/or the shared vault 210 itself may be stored in volatile memory. The shared vault may also be stored on a server accessible by the mobile device 200, such as a web server associated with enterprise resources 260. Upon first use, loss of power, and/or reboot, the shared vault may need to be re-created. An application on mobile device 200, such as a master application, may operate to retrieve the shared vault from the web server and re-create shared vault 210 in the memory of the mobile device. Even if the shared vault 210 is stored in persistent memory, an application such as a master application may have to retrieve the shared vault from the web server upon a first time use or if the shared vault is deleted, becomes corrupted, or is otherwise compromised.

Although FIG. 2 illustrates one shared vault 210, it should be understood that aspects described herein may provide more than one shared vault. For example, different shared vaults could be provided for different users of mobile device 200. The mobile device may include a first shared vault for a first user and a second shared vault for a second user. The shared vaults may be logically separate and separately encrypted with distinct user entropy associated with the respective user, as discussed further herein. Additionally and/or alternatively, the mobile device 200 may maintain more than one shared vault to provide different levels of protection. For example, the mobile device may maintain a first shared vault for applications having a first level of protection (such as trusted applications requiring first credentials) and a second shared vault for applications having a second level of protection (such as highly secure applications requiring second credentials).

Having discussed an example computing environment that may be used in providing and/or implementing various aspects of the disclosure, as shown in FIG. 2, a method according to some aspects of this disclosure will be discussed with reference to FIG. 3.

Figure 3:
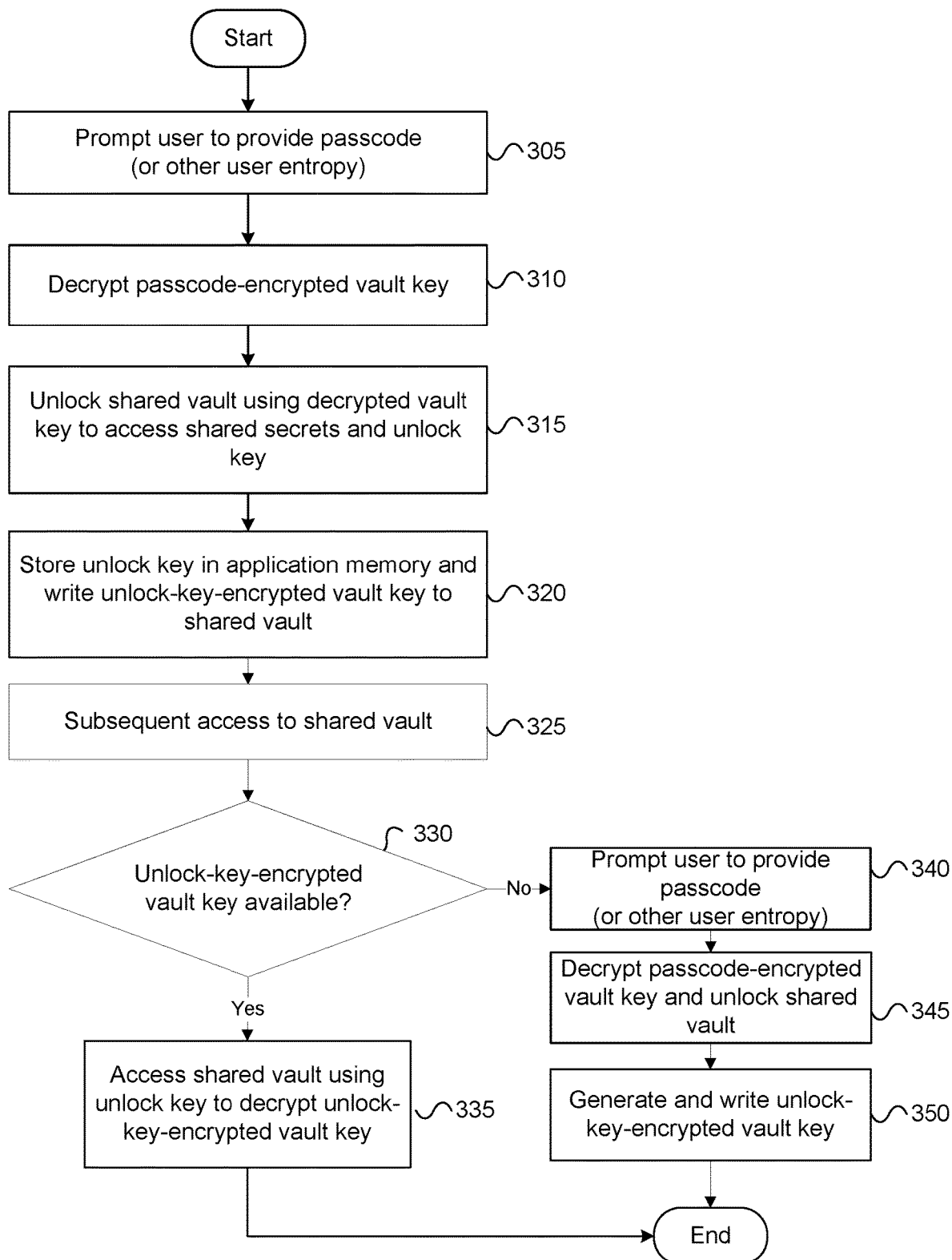
FIG. 3 depicts a flow chart illustrating a process for accessing a shared secret vault in accordance with one or more illustrative aspects discussed herein.

FIG. 3 illustrates an example of a method of providing access to shared secrets between applications using user entropy and single sign on features, according to one or more aspects described herein. In one or more embodiments, the method illustrated in FIG. 3 and/or one or more steps thereof may be performed by a computing device (e.g., generic computing device 100 and/or mobile device 200). In some embodiments, the method illustrated in FIG. 3 may be performed by a mobile device operating in a managed application environment. The mobile device may execute one or more applications, generate a user interface presenting output from the applications, and accept user input from a range of input types, including touch input, gestures, mouse input, keyboard input, microphone input, camera input, and the like. In other embodiments, the method illustrated in FIG. 3 and/or one or more steps thereof may be embodied in computer-executable instructions that are stored in a computer-readable medium, such as a non-transitory computer-readable memory.

At step 305, an application, such as a managed application, may begin a process to access a shared vault having stored therein shared secrets, such as server access credentials. The shared vault may be stored in an unsecured memory portion of the mobile device and may be accessible to any application executing on the mobile device. The application may prompt a user to provide user entropy such as a PIN, a password, and/or biometric data associated with the user. In some embodiments, the application may perform step 305 in response to a first time use of the application by the user. For example, the application may be a managed email application newly installed by the user. In some embodiments, the application may perform step 305 in response to a user request to access enterprise resources for the first time. In some embodiments, the application may perform step 305 in response to determining that a temporary vault key record (e.g., the unlock-key-encrypted vault key 216 of FIG. 2) has been deleted or is otherwise unavailable.

At step 310, the application may access a passcode-encrypted vault key stored in the shared vault. The application may decrypt the passcode-encrypted vault key to generate a decrypted vault key. The passcode-encrypted vault key may be further encrypted with device entropy (such as a unique value associated with the device and known/accessible by managed applications and not by unmanaged application). This may provide additional security and may help reduce the risk of phishing attacks that may capture a user's passcode. Additionally and/or alternatively, the passcode-encrypted vault key may be further encrypted with application entropy (such as a value embedded within the application and not accessible to other applications). In such an embodiment, the shared vault may store multiple passcode-encrypted vault keys corresponding to each application.

At step 315, the application may unlock a vault database of the shared vault using the decrypted vault key. The application may decrypt information stored in the vault database using the decrypted vault key. For example, the application may access shared secrets, such as network credentials, stored in the vault database. In addition, the application may access an unlock key stored in the vault database.

At step 320, the application may store the unlock key in memory associated with the application. The unlock key may be stored by the application in application specific memory maintained by the system for use by the application, and may be stored in memory inaccessible by other applications. The unlock key may be used by the application to decrypt an unlock-key-encrypted vault key record stored in the shared vault, thereby allowing the application to bypass future prompts requesting user entropy. If the unlock-key-encrypted vault key is not stored in the shared vault, the application and/or the shared vault may generate the unlock-key-encrypted vault key using the unlock key, the decrypted vault key, and/or device entropy. The application and/or shared vault may cause the unlock-key-encrypted vault key to be written to the shared vault.

At step 325, the application again begins to access the shared vault. At step 330, the application determines whether the unlock-key-encrypted vault key is present in the shared vault. If the unlock-key encrypted vault key is present in the shared vault, the method proceeds to step 335 and the application decrypts the unlock-key-encrypted vault key and uses the decrypted vault key to access the vault database.

If the unlock-key-encrypted vault key has been deleted or is otherwise unavailable in the shared vault, the method proceeds to step 340. The unlock-key-encrypted vault key may have been deleted based on an inactivity timer stored by the shared vault and managed by registered applications with access to the shared vault. At step 340, the application may prompt the user to provide user entropy. At step 345, the application uses the user entropy to decrypt the passcode-encrypted vault key. At step 350, the application uses the decrypted vault key to decrypt and access the vault database. The application also generates the unlock-key-encrypted vault key based on the unlock key, the decrypted vault key, and/or device entropy and writes the unlock-key-encrypted vault key to the shared vault.

Having discussed an example computing environment and an example method that may be used in providing and/or implementing various aspects of the disclosure, a number of embodiments will now be discussed in greater detail.

As described above, in some embodiments, applications operating on a mobile device may be part of a managed framework and may be wrapped in a secure wrapper providing management services and implementing various policies regarding operation of the applications and facilitating access of enterprise resources by those applications. In some embodiments, the managed framework may be the XenMobile and MDX frameworks provided by Citrix Systems, Inc., of Fort Lauderdale, Fla. The device may include a master application associated with the managed framework. For example, the device may include the WorxHome application associated with the MDX framework. Although some example embodiments are disclosed utilizing the MDX framework, WorxHome, and other MDX applications, it should be understood that the techniques and features described herein may be implemented using any suitable device management or enterprise resource access framework, with or without a master application.

As described above, some aspects of this disclosure relate to providing single sign on features to applications through registration with a shared vault encrypted with user entropy (such as a passcode). In some embodiments, the applications that may access the shared vault are managed applications (such as MDX applications, or applications of any suitable framework). The shared vault may be created by a master application (such as WorxHome, or any suitable master application) and/or a managed application on first time use. The shared vault may be secured with user, application and/or device entropy. Each managed application may register itself with the shared vault on first time use, rather than having to use inter-process communication to coordinate registration with a master application. Each managed application may assist in managing a vault lock state, which may be based on a global or per-app inactivity timer, for example. The managed applications may "unlock" and access the shared vault with the single sign on techniques described herein, but the vault remains stored in an encrypted form.

Some embodiments may provide one or more security and user experience modes. These security (and user experience) modes may represent various configurations of the mobile device, framework, groups of applications, and/or individual applications. In an interactive mode, an application may prompt a user to provide user entropy (such as a passcode) on first time use as well as after period of inactivity. This mode may provide additional security features over other modes. In a hybrid mode, an application may prompt a user to provide a passcode or a password, such as a one-time password, on first time use. Subsequently, the application may be "registered" with the shared vault and may not require the user to re-enter the user entropy to access the shared vault by storing an unlock key. In a non-interactive mode, a shared key may be used in place of user entropy. In such a mode, the shared key could be built into the applications and/or wrapper, or the shared key could be distributed by a managed application server. The non-interactive mode may be more vulnerable to attack but may be preferred in implementations where uninterrupted user experience is a priority. However, in each mode, the system may utilize application entropy and/or device entropy to further encrypt the shared vault in order to prevent phishing attacks that may trick a user into providing their passcode to a rogue application.

Some aspects described herein may provide distributed authentication services and allow successful authentication in one registered application to be effective in another registered application. Authentication manager logic may be built into each line of business/mobile application management application. Authentication states (such as access gateway tickets, certificates, SAML tokens, a partial or complete VPN stack, and the like) may be synchronized between registered applications by way of the shared vault. Authentication prompts may be embedded in each application. As a result, a user may register an application and begin to access enterprise resources that have been authenticated in another application. This may avoid context switches (or "flips") between multiple applications and improve user experience.

One example of a logical structure for the shared vault was discussed above in regard to FIG. 2. In some embodiments, a record keeping portion of the shared vault may store a permanent vault key record (e.g., passcode-encrypted vault key 212, in some embodiments) and a temporary vault key record (e.g., unlock-key-encrypted vault key 216, in some embodiments). The data stored in the shared vault may be protected using a vault key. The vault key may be associated with a strong encryption scheme. For example, in some embodiments the vault key may be a 2048 bit key for RSA encryption. The vault key may be encrypted and stored in one or more permanent vault key records. In some embodiments, there is one permanent vault key record, and it may be encrypted with user entropy (such as a passcode) and device entropy (which may be a unique value associated with the device and accessible by managed applications). According to some aspects described herein, the device entropy may be easily accessible to managed applications authorized to utilize the shared vault, and may be unknown and difficult to access and/or inaccessible by unmanaged applications. In other embodiments, there may be multiple records corresponding to respective ones of the managed applications stored on the device. Each of the multiple records may be encrypted with user entropy, device entropy, and application entropy associated with the respective application. This may provide enhanced security, such as by preventing passcode phishing attacks, which may allow an attacker to circumvent user entropy.

The vault key may also be stored in one or more temporary vault key records encrypted using an unlock key (which may also be referred to as a single sign on (SSO) key), such as an AES key, and device entropy. The temporary vault key record (which may also be referred to as a single sign on (SSO) record), may have a timed life or be maintained until a specified inactivity period has elapsed. Applications that are registered with the shared vault may store the unlock key used to decrypt the temporary vault key record. This may allow registered/trusted applications to decrypt and access shared secrets stored in the shared vault for the duration of the inactivity timer. This may be used to provide single sign on features within the registered applications, as one registered application may access enterprise resources authenticated by another application. The record keeping portion of the shared vault may also store a passcode validator. The passcode validator may be used to determine whether the user-provided user entropy is valid. In one embodiment, the passcode validator may comprise a random phrase encrypted with user entropy and, along with the original phrase, both hashed and encrypted using device entropy accessible to managed applications.

The shared vault may also include a vault database. The vault database may be encrypted using the vault key. The vault database may store common secrets shared between registered applications, such as access gateway tickets, SAML tokens, certificates, common policies, and the like. The vault database may also store per-app secrets. The per-app secrets may be further encrypted with application entropy of the respective application. This may prevent other applications from accessing the secret data of another application. Per-app secrets may include S1 and S2 secrets (e.g. server generated per-app data encryption keys), certificates, per-app policies, and the like.

The vault database may also include an SSO key record (e.g. unlock key 222, in some embodiments). The SSO key may be an AES 256 bit key for use in decrypting the temporary vault key record. Although the example embodiment described here uses an AES decryption key, it should be understood that any suitable encryption algorithm and corresponding key type may be used to secure the temporary vault key record. Each registered application may retrieve the SSO key from the vault database and store the SSO key in its app-specific permanent storage/volatile storage. For example, on mobile devices running the Windows Phone operating system, the SSO key may be stored in app isolated storage. As another example, on mobile devices running the iOS operating system, the SSO key may be stored in a keychain associated with the application. The stored SSO key may be further encrypted using device entropy and/or application entropy of the respective application. The vault database may further include an inactivity timer that tracks inactivity associated with the shared vault and vault key. The inactivity timer may track a timestamp and/or processor tick count of a last unlock of the vault using user entropy. In other embodiments, the inactivity timer may track an elapsed time since the shared vault was accessed using user entropy or the SSO key. In some embodiments, combinations of the last unlock with user entropy and the last access using the SSO key may be used. The criteria used in tracking inactivity may be configured by one or more policies and may utilize multiple criteria. The criteria may be global, related to a group of applications, and/or related to individual applications. Different inactivity criteria may be used for different shared vaults, and the inactivity criteria may be configurable by the user according to his preferences.

Figure 4:
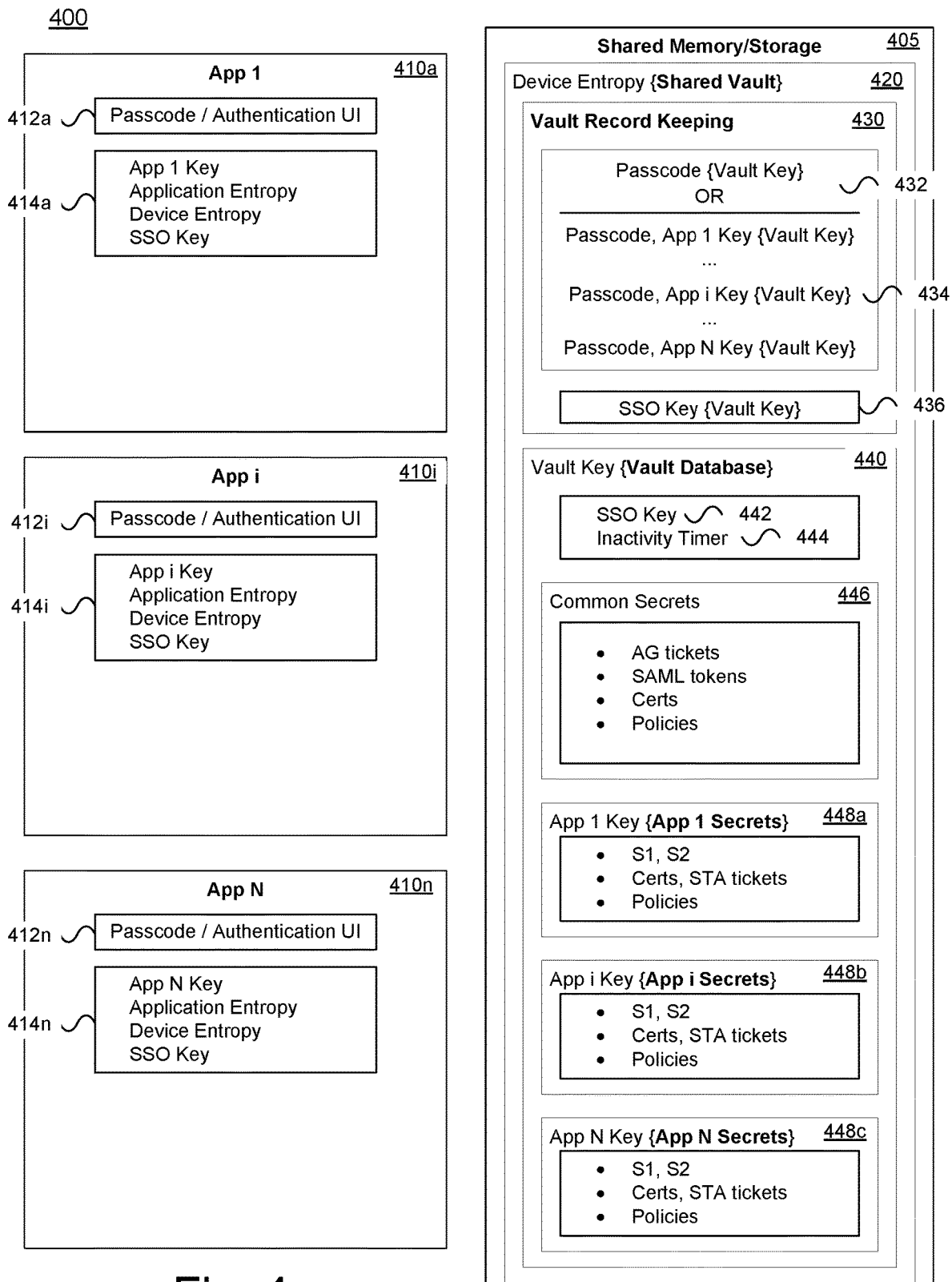
FIG. 4 depicts an example implementation of a logical shared secret vault in accordance with one or more illustrative aspects discussed herein.

FIG. 4 depicts an example implementation 400 of a logical shared secret vault 420 in accordance with one or more illustrative aspects discussed herein. As used in FIG. 4 (and the following figures), the notation "Key {data}" (e.g., "Passcode {Vault Key}") denotes that the data item is encrypted with the key (e.g., the vault key is encrypted using the passcode). FIG. 4 illustrates one example embodiment of a logical shared vault design 400 in which all of the vault record keeping entries 430 and vault database 440 with common secrets 446 and per-app secrets 448a, 448b, and 448c share the same memory location (e.g., unsecured shared application memory 405).

In the example implementation of FIG. 4, applications 410a, 410i, and 410n (collectively applications 410) may utilize shared memory 405 to exchange common secrets 446. Shared memory 405 may be configured to store a shared vault 420 which is encrypted using device entropy. The shared vault may comprise vault record keeping section 430 and vault database 440. Vault database 440 may be further encrypted using a vault key. The vault database 440 may store common secrets 446, such as AG tickets, SAML tokens, certificates, and policies. The vault database may further store per app secrets 448a, 448b, and 448c which may be further encrypted with application specific entropy and/or application specific keys. Per-app secrets 448 may include S1 and S2 information, certificates, STA tickets, and/or policies for a particular application.

The vault record keeping section 430 may store one or more encrypted records that can be used to derive the vault key. A first vault key record may be a user-entropy encrypted vault key record or passcode encrypted vault key record 432, which may be used to unlock the vault using a passcode received from the user by a particular application 410 through a respective passcode/authentication user interface 412a, 412i, or 412n, as described above. Additionally or alternatively, vault record keeping section 430 may store a plurality of per-app vault key records 434 which may be encrypted using the passcode in combination with application specific entropy. Application specific entropy may be stored in application memory 414a, 414i, and 414n for use by a respective application, along with device entropy in some implementations. A per-app vault key record 434 may be used by a respective application 410 to unlock the vault using a passcode received through its passcode/authentication UI 412.

Once an application has decrypted the vault key from the passcode-encrypted vault key record 432 or 434, the application may decrypt the vault database 440 using the vault key. The application may generate a first copy of the vault key by decrypting the passcode-encrypted vault key record 432 and/or a respective per-app passcode-encrypted vault key record 434. Applications may avoid and/or may be prevented from storing the first copy of the vault key (or any copy of the vault key).

In addition to storing common secrets 446 and per-app secrets 448, the vault database 440 may store an SSO key 442, also referred to herein as an unlock key. The SSO key 442 may be accessed and stored by an application that has decrypted the vault for later access of the vault without requiring further entry of the user's passcode. The SSO key 442 may be stored in application memory 414 by an application that has decrypted the vault. The SSO key 442 may be used by the application to generate a second vault key record 436 comprising the vault key encrypted using the SSO key 442. This second vault key record 436 may be stored in the vault record keeping section 430 thereby placing the vault in an "unlocked" state. Any application that has decrypted the vault using the passcode encrypted vault key record and has stored the SSO key 442 may then access the vault data by decrypting the second vault key record 436. As a result, applications that have previously unlocked the vault using user entropy may be able to access the vault at a later time without requiring the user to re-enter the passcode.

The vault database 440 may store an inactivity timer 444. The inactivity timer 444 may be a value used by managed applications to determine whether the shared vault 420 has been inactive for at least a predetermined period of time. When an application 410 attempts to access the shared vault 420 using the second vault key record or SSO key encrypted vault key 436, the application may check the inactivity timer to determine whether the vault should remain unlocked. If the inactivity timer 444 indicates that the vault has been idle for more than a set threshold amount of time, the application may be configured to delete/remove the second vault key record or SSO key encrypted vault key 436 and prompt the user to input user entropy again to unlock the vault.

Figure 5:
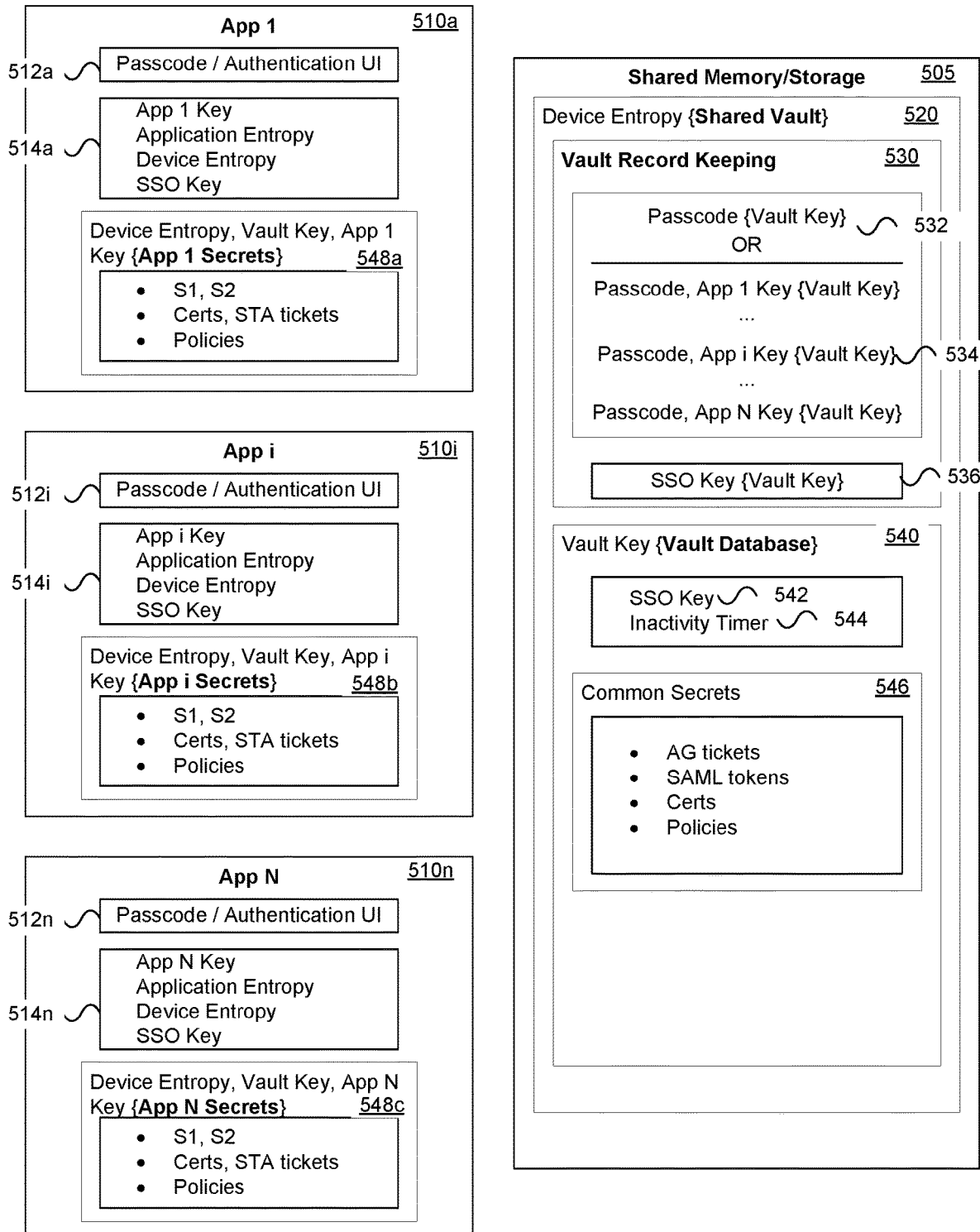
FIG. 5 depicts another example implementation of a logical shared secret vault in accordance with one or more illustrative aspects discussed herein.

FIG. 5 depicts another example implementation 500 of a logical shared secret vault 520 in accordance with one or more illustrative aspects discussed herein. FIG. 5 illustrates a similar logical shared vault design as FIG. 4. In FIG. 5, the key management may be performed in a similar manner, however the per-app secrets may be stored in application-specific storage 548*a*, 548*b*, and 548*c*, separate from the rest of the vault assets. For example, the vault key records 532, 534, and 536 may be stored in vault record keeping section 530 of unsecured shared application memory 505, and the shared secrets 546 may be stored in vault database 540 of unsecured shared application memory 505, while the application-specific secrets 548*a*, 548*b*, 548*c* may be stored in reserved and/or isolated application memory. In one example, where the mobile device uses a Windows Phone operating system, the per-app secrets may be stored in application permanent storage such as application isolated storage. In another example, where the mobile device uses an iOS operating system, the per-app secrets may be stored in the keychain associated with the application. The design illustrated in FIG. 5 may provide additional security benefits as it avoids a single point of attack holding all assets (a "honeypot"). In addition, the split-storage vault design may allow for different types of memory to be used for the different assets in accordance with different security and user experience preferences and policies. Use of different types of memory and the advantages thereof are discussed further below.

Otherwise, like-named components of FIG. 5 may operate in similar manner to that described above with regard to FIG. 4. Shared memory 505, shared vault 520, vault record keeping section 530, and vault database 540 may store similar information and operate similarly to their counterparts in FIG. 4, except as described further below. Applications 510*a*, 510*i*, 510*n* may correspond to Applications 410*a*, 410*i*, and 410*n* of FIG. 4. Passcode/Authentication UIs 512*a*, 512*i*, and 512*n* and application specific memory 514*a*, 514*i*, and 514*n* may store similar information and operate similarly to their counterparts in FIG. 4.

As mentioned above, the use of split-storage may allow for use of different types of storage to store different portions of the data stored by the shared vault and the managed application. The use of permanent storage for the part of the database containing application-specific assets, in some embodiments, may allow the assets to be available even after a device reboot, and the assets/secrets are designed to be long-lived (e.g., S1 and S2 per-app data encryption keys, certificates, Secure Ticket Authority (STA) tickets, app policies). If they are kept in volatile memory instead, after a device reboot the application may have to retrieve these assets again from the server, which may require additional authentication and be disruptive to user experience.

The use of volatile memory for the vault record keeping entries and the part of the database containing common assets (e.g., access gateway tickets, SAML tokens, certificates, common policies), in some embodiments, may provide additional security measures. "Rooting" a device normally requires at least one reboot, which means that all of the vault record keeping entries and common secrets may be unrecoverable by an attacker without proper authentication. The temporary vault key record encrypted with the SSO (unlock) key and device entropy may also be stored in volatile memory and may also be removed from memory upon reboot.

When volatile memory is used to store one or more portions of the shared vault, in some embodiments, a copy of the vault record keeping entries and common assets could also be kept in the permanent isolated storage of the master application (e.g., WorxHome/Receiver) and/or the managed app that initially created the vault, or in all registered managed apps. Upon device reboot, in some embodiments, the assets may be restored from the permanent storage following authentication. Depending on whether the user launches a registered app first or not, the restore may involve a single flip to the master app or a registered managed app, followed by authentication, such as a prompt for user entropy (e.g. passcode). Since the common assets such as access gateway tokens might be stale, their restoration may also involve re-authentication to the server.

On some mobile platforms shared volatile memory may not be available and only persistent memory may be available. In some embodiments, upon device reboot, the master app or any managed app first launched by the user may detect that the device has been rebooted, e.g. by reading a system log entry, and could purposefully remove the temporary vault key record encrypted with the SSO (unlock) key and/or the common assets. This may trigger a request for user entropy (e.g. passcode) to unlock the vault and/or re-authentication to the server to retrieve the common assets. Even when shared volatile memory is available, if a policy is configured that favors user experience over strict security, the vault record keeping entries and the common assets may be kept in permanent storage to allow for seamless experience following device reboot.

In some embodiments, the shared vault may also be cached on the server. In some embodiments only the common assets may be cached on the server, while the vault record keeping entries may be stored in local shared memory, and may still be restored from the master app (e.g., WorxHome/Receiver) or the managed app that initially created the vault as described above. Vault restoration from the server cache may require that the device be online. However, the common assets are generally useful for server access and therefore restoring them once the device is online may not have a significant negative impact on user experience while improving security.

On some platforms, and in some embodiments, it may be possible that the shared vault (whether stored in persistent or volatile memory) may be lost or removed by another mobile application, either accidentally or as part of a purposeful denial of service attack. For example when using an unprotected pasteboard on iOS or a file in a shared library on Windows Phone, any app may remove or corrupt the shared storage. In such cases the currently running managed app may detect a missing or corrupt vault state and could restore the vault from a cached version, either local or server-based, as described above.

Figure 13:
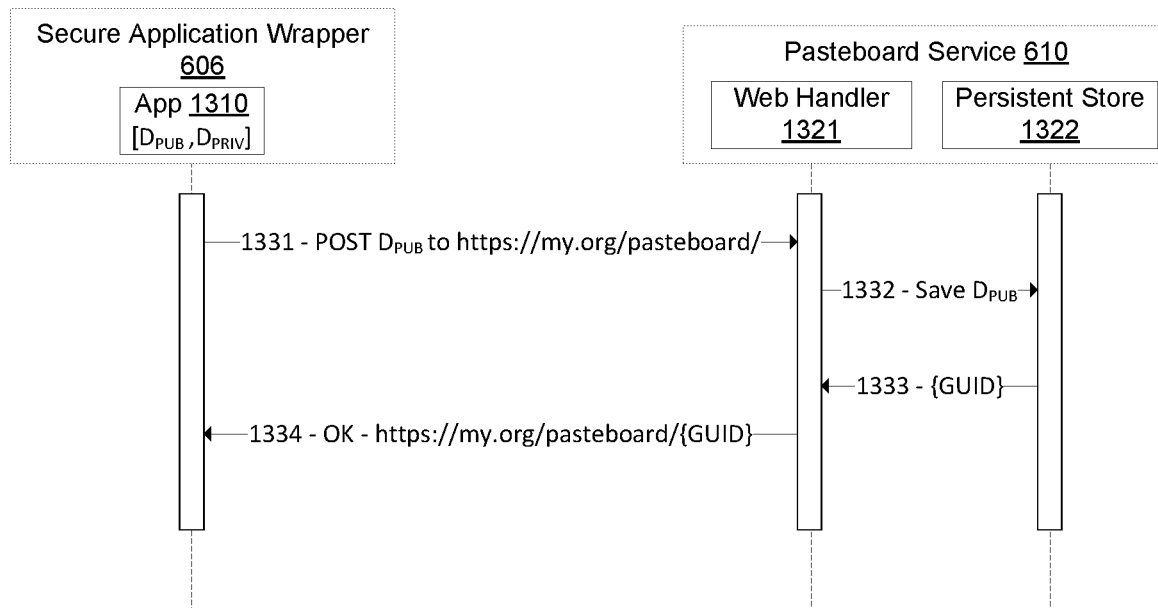
FIG. 13 depicts an example process flow illustrating a vault creation process on a web server in accordance with one or more illustrative aspects discussed herein.
Figure 14:
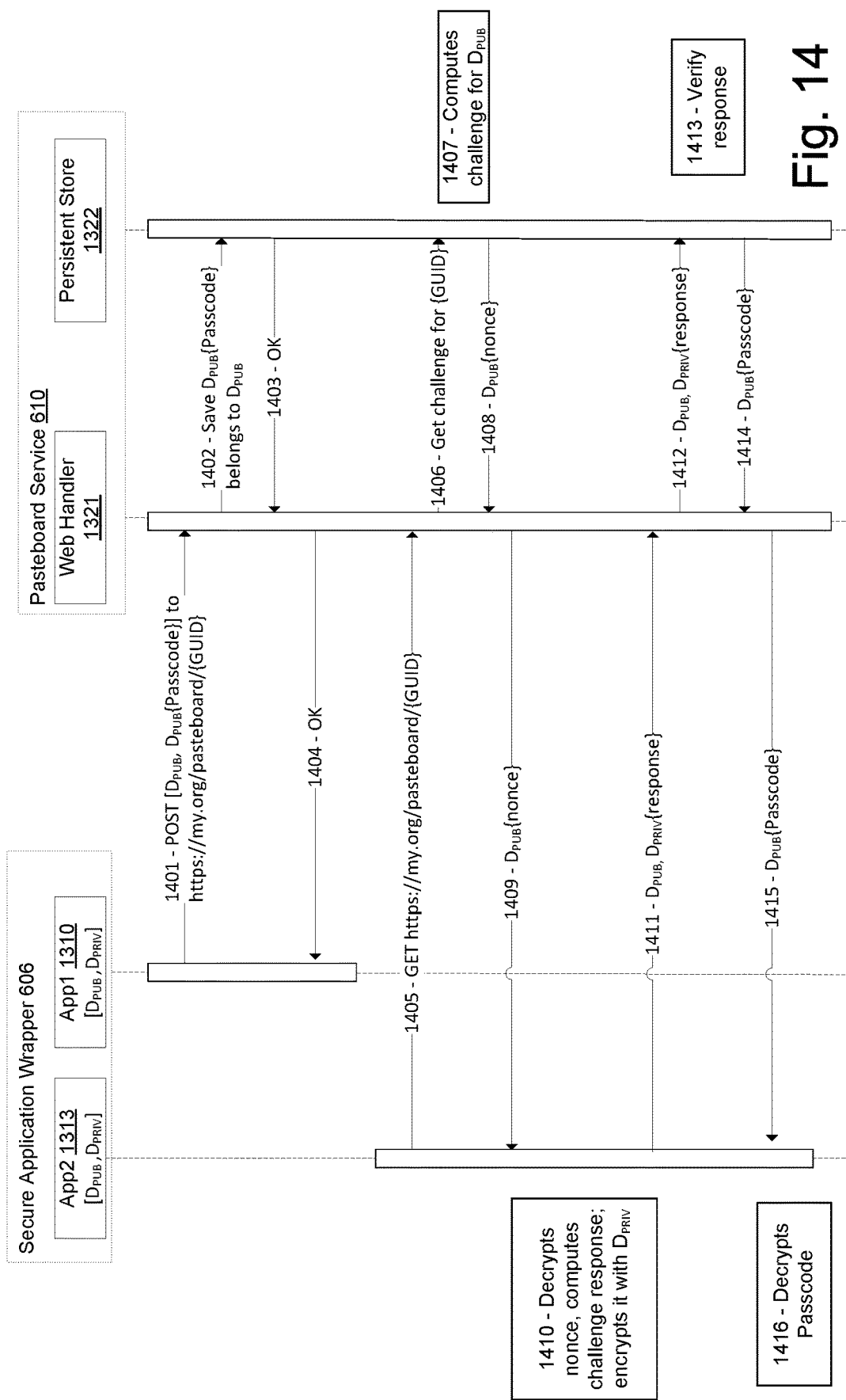
FIG. 14 depicts an example process flow illustrating a passcode retrieval process in accordance with one or more illustrative aspects discussed herein.
Figure 15:
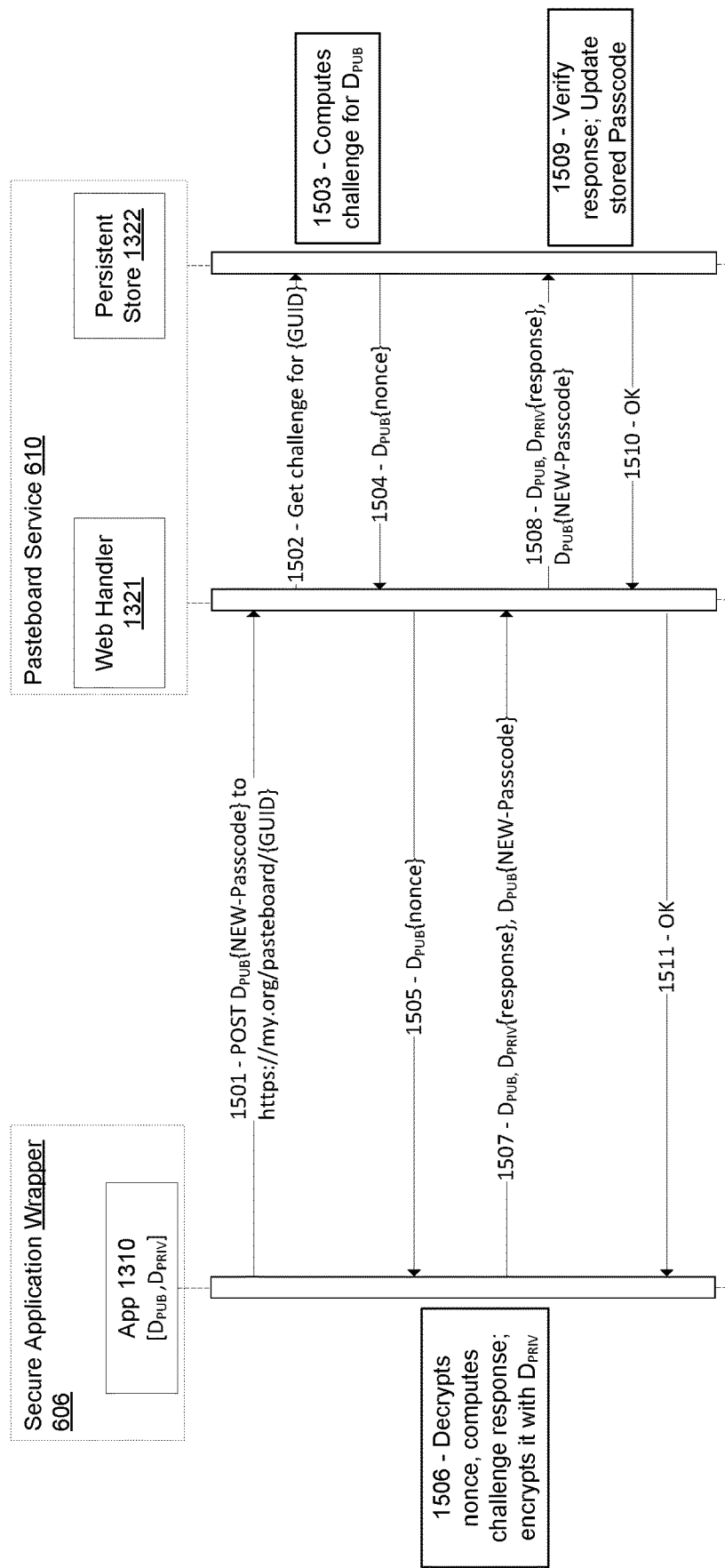
FIG. 15 depicts an example process flow illustrating a passcode update process in accordance with one or more illustrative aspects discussed herein.

Further details of the operation of the shared vault implementations depicted in FIGS. 4 and 5 are provided below with reference to FIGS. 6A-15. FIGS. 6A-12B illustrate example process flows according to one or more aspects described further herein. Each figure is illustrated as including enterprise server 601, master application 602, application i 603, application n 604, shared memory/storage 605, and secure application wrapper 606. Some figures are illustrated as including further entities, such as secondary vault 607, gateway 608, enterprise resources 609, and/or active directory service 611. FIGS. 13-15 illustrate further example process flows and include secure application wrapper 606 and a pasteboard service 610. It will be understood that like-named and like-labeled parts of FIGS. 6A-15 may represent the same respective logical entities performing additional and/or alternate steps and/or roles, as described further below.

Figure 6A:
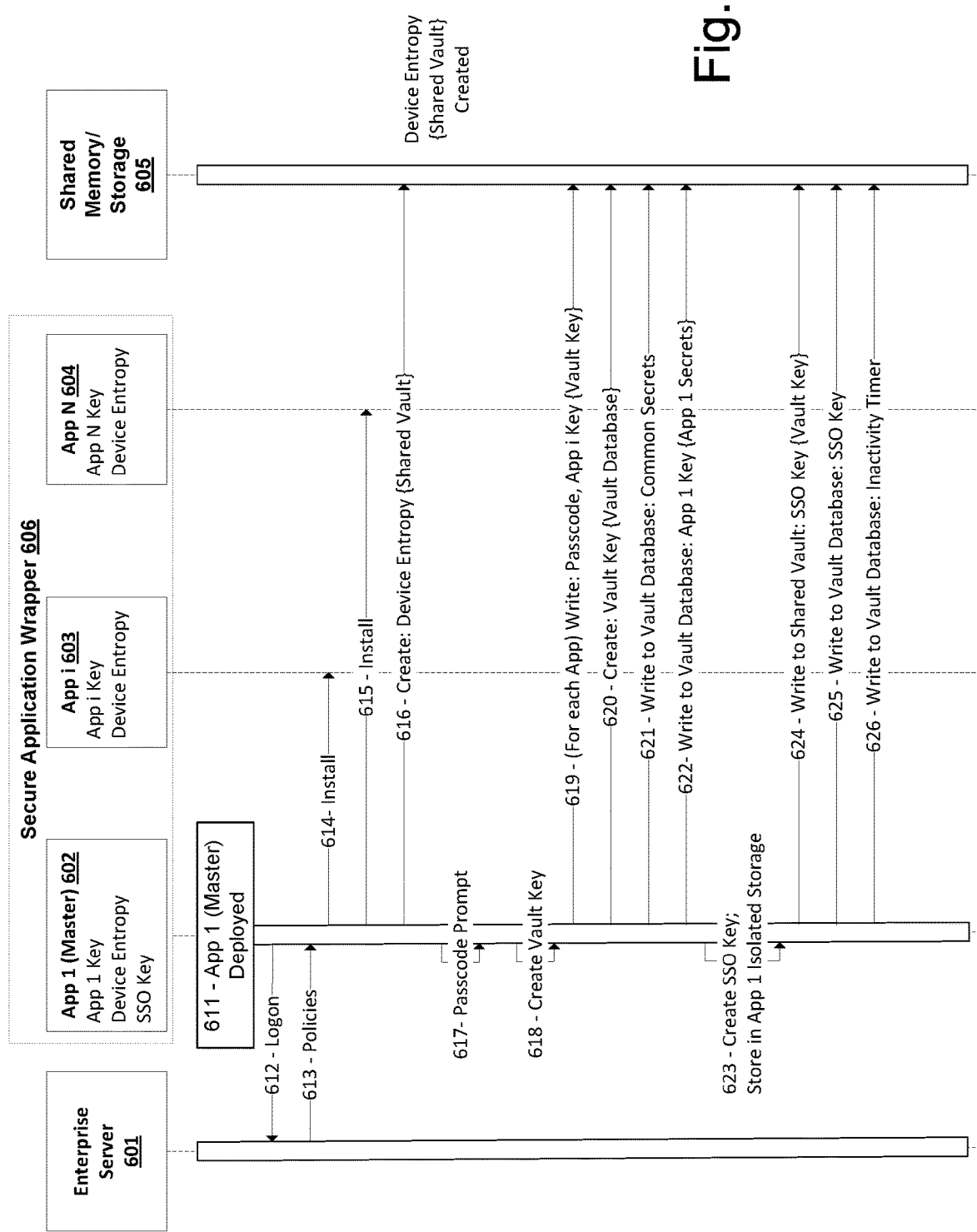
FIG. 6A depicts an example process flow illustrating the creation of a shared secret vault in accordance with one or more illustrative aspects discussed herein.

FIG. 6A depicts, an example process flow illustrating the creation of a shared secret vault in accordance with one or more illustrative aspects discussed herein. As illustrated in FIG. 6A, at step 611 a master application 602 such as WorxHome may be deployed to a device. The master application 602 may logon to an enterprise server 601 such as XenMobile at step 612 and retrieve security policies for the device and enterprise resources at step 613. The master application 602 may facilitate the installation of one or more other managed applications, e.g. application i 603 and application n 604, using a framework such as MDX at steps 614 and 615. The master application 602 may create the shared vault and encrypt the shared vault using device entropy at step 616. At step 617, the master application 602 may prompt the user to provide a passcode (and/or other user entropy), and may generate a vault key at step 618. In some embodiments the vault key may be generated using a secure random number generation API.

In the illustrated embodiment, at step 619 the master application 602 generates an encrypted vault key record for each installed application. The vault key record for each application is encrypted using application entropy and the user entropy. In other embodiments, a single encrypted vault key record may be created, encrypted with the user entropy. In the illustrated embodiment, at step 620 the master application 602 creates a shared vault database encrypted with the vault key in shared memory/storage 605. At step 621, the master application 602 may write shared secrets such as server access credentials and shared policies to the shared vault database. At step 622, the master application 602 may write application specific secrets to the shared vault database as well. At step 623, the master application 602 may generate an SSO key and store the SSO key in application-specific storage associated with the master application 602. At step 624, the master application 602 may generate a second vault key record comprising the vault key encrypted using the SSO key and store the second vault key record in the shared vault. At step 625, the master application 602 may write the SSO key to the shared vault database and, at step 626, initiate an inactivity timer.

In some embodiments, when a user entropy mode is configured and the shared vault is created, a passcode validator may also be created as part of creating the vault record-keeping structures in the shared vault. The passcode validator may serve the purpose of validating that the correct passcode is entered by the user before attempting cryptographic operations on stored assets. In some embodiments, the passcode validator may comprise a random phrase encrypted with user entropy (passcode), along with the original random phrase, both of which may be hashed and encrypted with device entropy. Other embodiments may involve use of additional entropy derived from another device, such as a token, server, paired device, laptop, smart watch, and the like.

In some embodiments, different content may be included in the various authentication user interfaces to disambiguate the reason for the authentication prompts. On first time use of an application, an application may present a registration user interface seeking an endorsement that the application should be allowed access to the business container which will permit the app access to the enterprise network, cached credentials, shared storage, app policies, and the like. For example, a managed application such as WorxMail may generate a prompt stating: "WorxMail requests permission to run as an enterprise app. To allow, enter your Worx PIN. To disallow, choose Quit." At a later time, once the application has been registered, the application may present a different unlock user interface requesting the user's passcode (e.g. a PIN within the managed framework). This user interface may be used to retrieve the user entropy for unlocking the shared secret vault, such as after the vault has been locked after a period of inactivity. Another different user interface may be used for other authentication, such as a network-level authentication user interface presented by the master application to retrieve user credentials for establishing the shared secret vault or granting access to network services. For example, the master application may prompt a user to enter their user name, enterprise password (which may be distinct from their passcode used to unlock the vault), and/or second form of authentication (such as a token or other two-form authentication form).

According to some aspects, if the user fails to enter the correct passcode in an app while attempting to register it, the system may count a number of failed entries on a per app basis. If the number of failed entries exceeds a maximum, such as 15 failed entries, the app may be locked. In some implementations, the user may then be required to delete and re-download the app. In others, the user may unlock the application through some other form of authentication or have an administrator unlock the application and/or the user's account. In some embodiments, there may not be a global maximum failed entry count for the passcode, because the app may be unable to share the count with other apps before it has been registered and gained access to the shared secret vault.

Figure 6B:
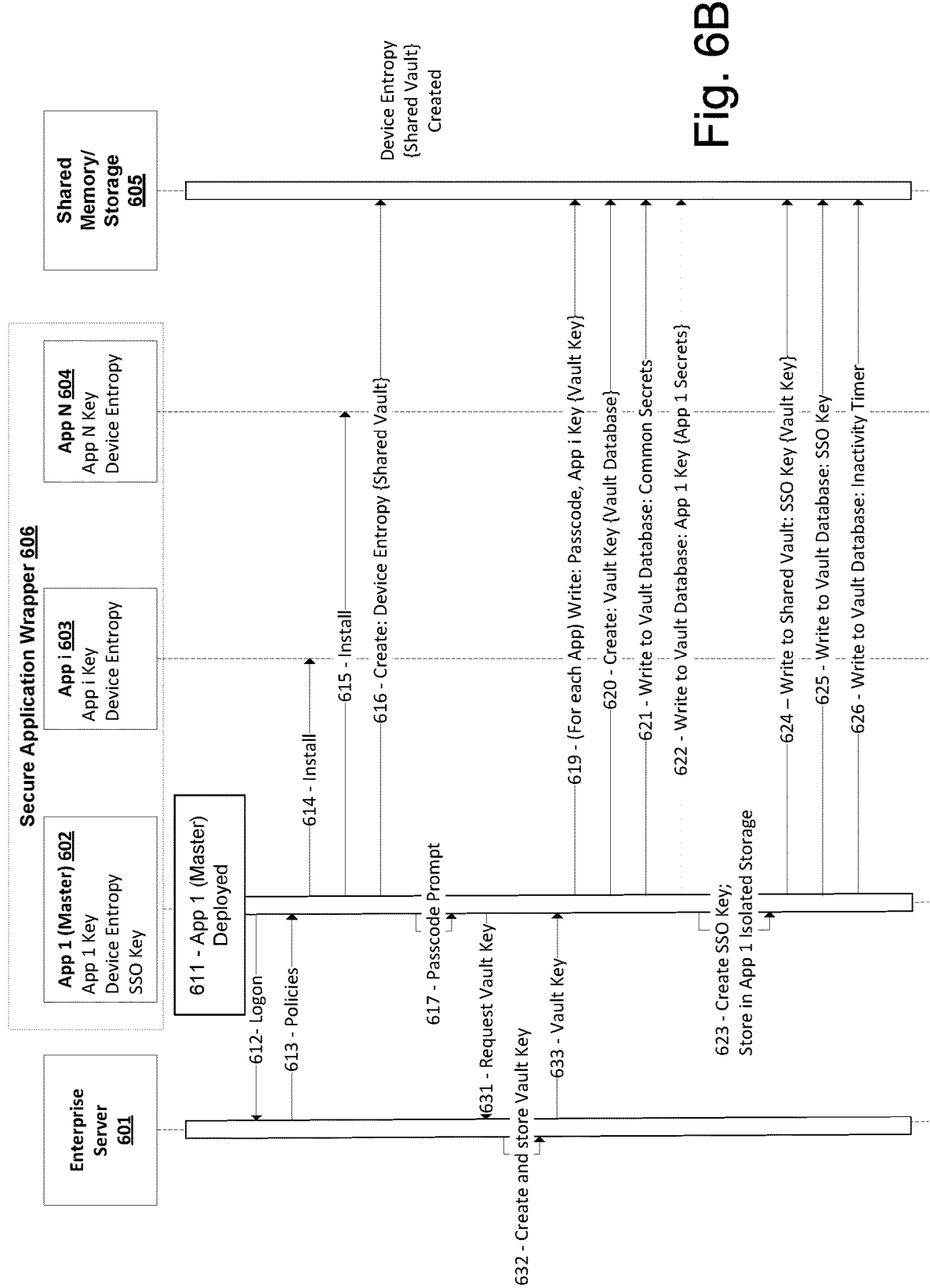
FIG. 6B depicts another example process flow illustrating the creation of a shared secret vault in accordance with one or more illustrative aspects discussed herein.

In the embodiment illustrated in FIG. 6A, the vault key is generated by the master application 602. In some embodiments, the vault key may be randomly generated by the server 601 and delivered to the master application 602 over a secure connection as illustrated in FIG. 6B (discussed below). The generation of the vault key by the server may have the advantage that the server may also cache the vault key and make it recoverable by the master application based on strong authentication to the server.

FIG. 6B depicts another example process flow illustrating the creation of the vault key by the enterprise server according to some embodiments. The process illustrated in FIG. 6B proceeds similarly to that illustrated in FIG. 6A from step 611 through step 617. At step 631, the master application 602 may request that the enterprise server 601 provide a vault key for use in securing a shared vault to be stored in shared memory 605. At step 632, the enterprise server 601 may create and store the vault key. At step 633, the enterprise server 601 may return the created vault key to the master application 602. After the master application 602 receives the vault key from the enterprise server 601, the process may continue through steps 619-626 as described above with respect to FIG. 6A.

Figure 6C:
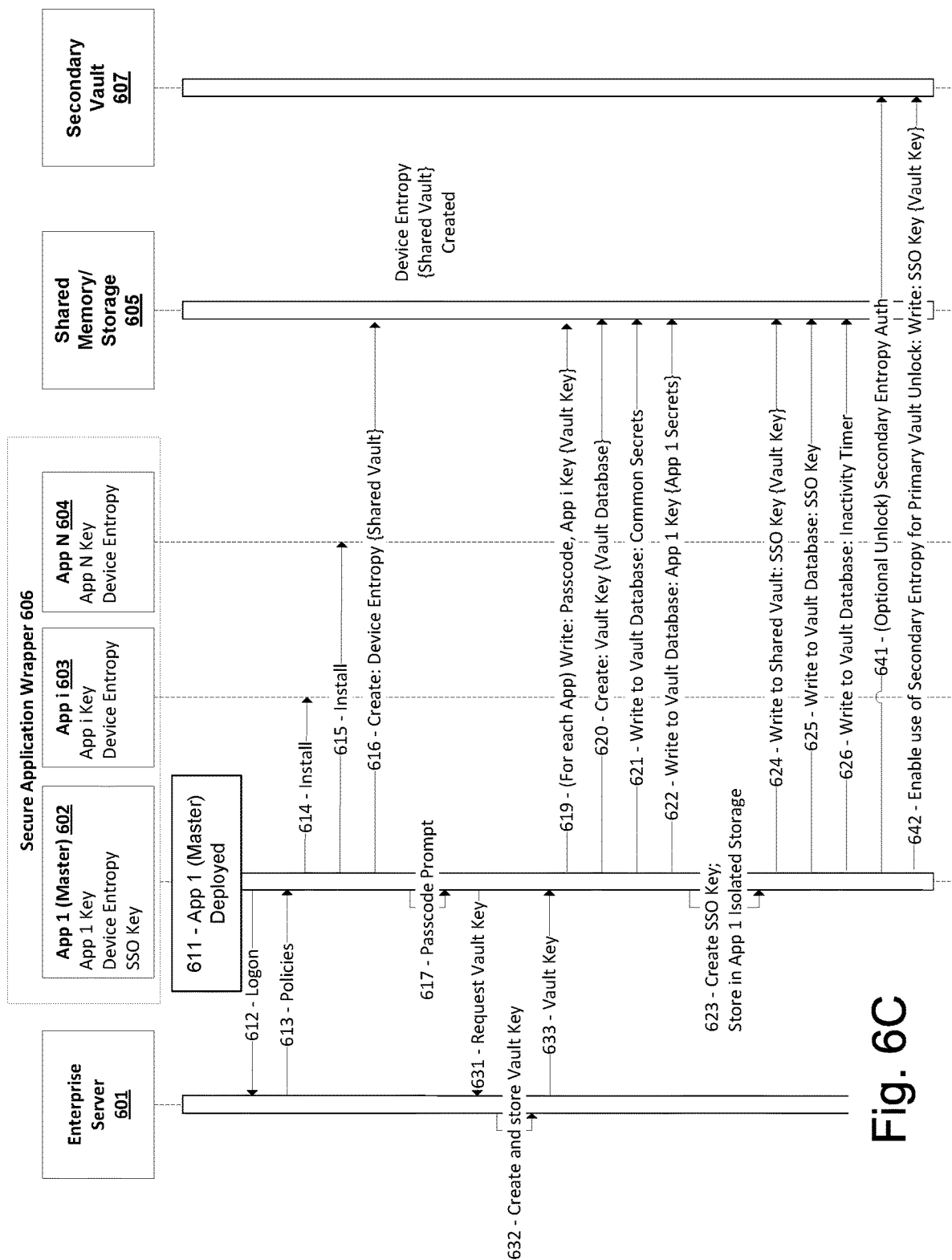
FIG. 6C depicts another example process flow illustrating the creation of a shared secret vault in accordance with one or more illustrative aspects discussed herein.

FIG. 6C depicts another example process flow illustrating the creation of the shared vault and use thereof further utilizing a secondary vault 607 to securely store the second vault key record or unlock key encrypted vault key. The secondary vault 607 may be secured using a second form of entropy different from the passcode or other user entropy used to secure the shared vault. For example, the secondary vault 607 may be secured using biometric information associated with the user such as a fingerprint, iris scan, voice print, or other biometric data. In one example embodiment, the secondary vault 607 may be secured using a user's fingerprint such as through the TouchID features provided by iOS devices. The use of a secondary vault 607 secured with biometric entropy may improve the user experience since it may be more convenient than typing a PIN or password. The process illustrated in FIG. 6C proceeds similarly to that illustrated in FIG. 6B from step 611 through step 626.

After the shared vault has been decrypted using the user entropy, the master application 602 (or other application 603, 604) may cause the SSO Record, e.g. the SSO Key encrypted vault key or second vault key record, to be written to the secondary vault 607. At step 641, the user may unlock the secondary vault by providing secondary entropy, such as biometric data associated with the user (e.g. fingerprint). In some embodiments, the application may be able to write to the secondary vault without prompting the user for the secondary entropy. At step 642, the application may enable the use of the secondary entropy for unlocking the shared vault through use of the secondary vault as follows. Generally, the master application 602 may store the SSO record into the secondary vault 607. The storing may be done, in some embodiments, during vault creation and/or during app registration depending on whether the secondary vault used can be shared globally or only per-app group, respectively. If the secondary vault 607 is shared between all apps (global), then it may be beneficial to store the SSO Record, i.e. the SSO Key/unlock key encrypted vault key, into the secondary vault 607 during creation of the shared vault.

If the shared vault happens to be locked when an application later tries to access the shared vault, such as after a period of inactivity where the SSO Key encrypted vault key has been removed from the shared vault, the application may authenticate/unlock the secondary vault 607 using the secondary entropy to retrieve the SSO Record. Once the SSO record is retrieved from the secondary vault 607, the application may unlock the shared vault for all registered apps by writing the SSO Record to the vault record keeping section (e.g. vault record keeping section 430 or 530) in the shared vault.

FIG. 7A depicts an example process flow illustrating a registration process with a shared secret vault, in accordance with one or more illustrative aspects discussed herein.

As illustrated in FIG. 7A, a managed application 603 may, at step 711, prompt a user to provide user entropy such as a PIN. The managed application 603 may prompt the user for the passcode on a first time use and/or after the system loses power or is rebooted. Using the passcode, the managed application 603 may be able to unlock and retrieve the vault key in step 712. The application 603 may generate a first copy of the vault key which may be decrypted from a first vault key record that is encrypted using the passcode (also using, in the illustrated embodiment, application entropy associated with the managed application 603). At step 713, the application 603 may unlock a vault database in the shared vault using the decrypted first copy of the vault key. At step 714, the managed application 603 may read the SSO key from the shared vault and, at step 715, store the SSO key in application-specific storage. At step 716, the managed application 603 may reset the inactivity timer due to the recent user entropy unlock performed by the managed application 603. At steps 717 and 718, the managed application 603 may read and write common secrets from the shared vault. At steps 720 and 721, the managed application 603 may read and write application-specific secrets to the shared vault. The managed application 603 may reset an inactivity timer each time the shared vault is accessed, in some embodiments. For example, in the depicted example process, the managed application 603 resets the inactivity timer at steps 719 and 722 following read/write activity in steps 717, 718, 720, and 721.

Figure 7B:
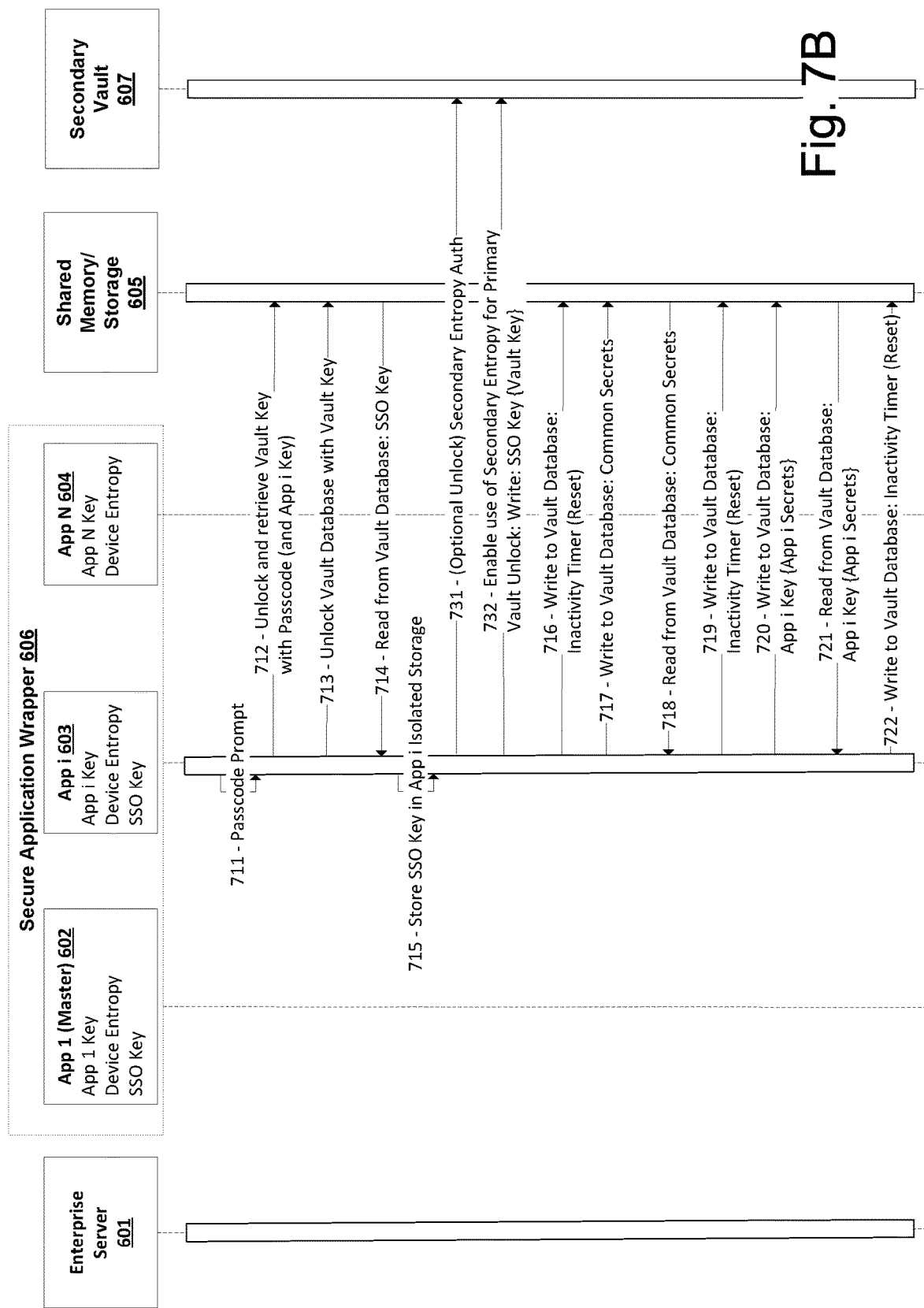
FIG. 7B depicts another example process flow illustrating a registration process with a shared secret vault.

FIG. 7B illustrates an embodiment where the managed application 603 may be registered using a secondary vault 607. The process may proceed similarly to that illustrated in FIG. 7A, and the process may still require that the passcode be entered as primary entropy (e.g. a PIN or active directory password depending on policy). In FIG. 7B, the illustrated embodiment additionally stores the second vault key record (i.e. the SSO key-encrypted vault key) in a secondary vault. The secondary vault may be, for example, a keychain or other operating system provided secured container that is protected by secondary entropy other than the user's passcode. For example, if iOS touch ID is enabled (or other secured container service), during app registration the SSO record (SSO-key-encrypted Vault Key) may be stored in both the shared vault (as in FIG. 7A) and in the secured container (e.g. a Touch ID-protected keychain) associated with the managed application group (e.g. applications under secure application wrapper 606). In some embodiments, this may be done silently without impacting the user experience.

In particular, as illustrated in FIG. 7B, the managed application may optionally unlock the secured container of the secondary vault 607 at step 731. Step 731 may take place after the managed application 603 has unlocked the vault database using the primary user entropy (e.g. passcode) and stored the SSO key in application isolated storage. At step 732, the managed application 603 may store the SSO key-encrypted vault key in the secondary vault 607. The managed application 603 may later prompt the user to enter his secondary entropy and retrieve the SSO key-encrypted vault key from the secondary vault 607. As the managed application 603 will have previously stored the SSO key, the managed application 603 may be able to generate a copy of the vault key using the SSO key-encrypted vault key retrieved from the secondary vault 607. As a result, the secondary entropy may be used to access a locked vault without requiring the user to re-enter his primary entropy (e.g. passcode). In some implementations, step 731 may not take place when writing to the keychain and can be done silently without UX impact. According to some aspects, the SSO key-encrypted vault key stored in the secondary vault 607 may remain even after the SSO key-encrypted vault key stored in the vault recording keeping section is deleted due to inactivity.

Figure 8:
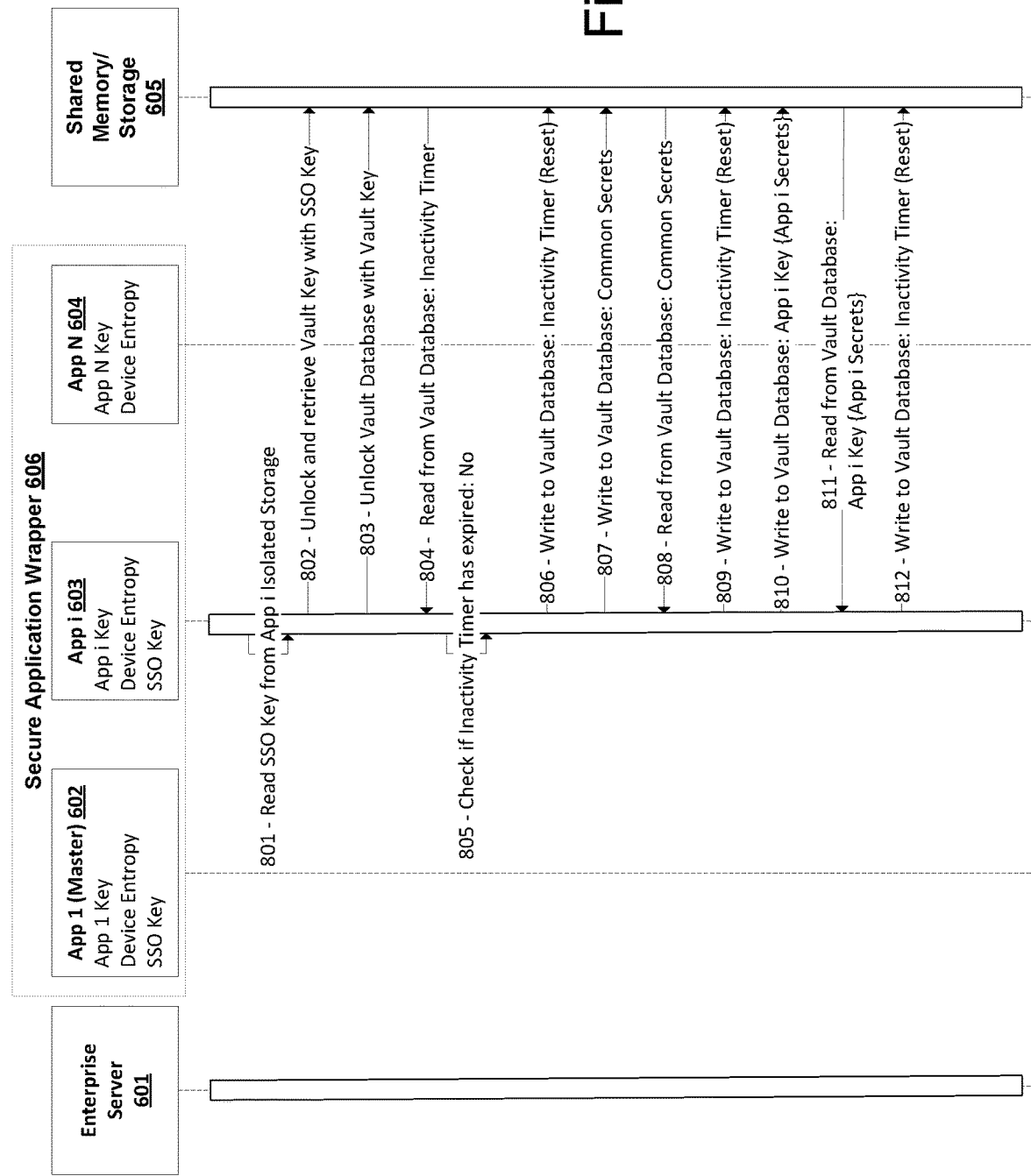
FIG. 8 depicts an example process flow illustrating a single sign on process incorporating an inactivity timer in accordance with one or more illustrative aspects discussed herein.

FIG. 8 depicts an example process flow illustrating a single sign on process incorporating an inactivity timer in accordance with one or more illustrative aspects discussed herein.

As illustrated in FIG. 8, the managed application 603 may use the SSO key stored in application-specific storage to decrypt the vault key without prompting the user to provide user entropy. The managed application 603 may check if an inactivity timer has expired or if other inactivity criteria are satisfied. When the timer has not expired and/or if the other inactivity criteria are not met, the managed application 603 may continue to access the shared vault 605 to read and write secrets.

In particular, at step 801 the managed application 603 may read the SSO key from application specific, isolated storage. At step 802, the managed application 603 may access the shared memory 605 to retrieve the second vault key record (i.e. the SSO key-encrypted vault key) and may generate a copy of the vault key by decrypting the second vault key record. At step 803, the managed application 603 may unlock the vault database using the generated copy of the vault key and access data stored therein. At step 804, the managed application 603 may read an inactivity timer stored in the vault database and, at step 805, check whether the inactivity timer has expired. In the process illustrated in FIG. 8, the managed application 603 determines that the inactivity timer has not expired and proceeds to step 806 where the inactivity timer is reset. At steps 807 and 808, the managed application 603 may read and write common secrets to the vault. At steps 810 and 811, the managed application 603 may read and write application-specific secrets to the shared vault. The managed application 603 may reset an inactivity timer each time the shared vault is accessed, in some embodiments. For example, in the depicted example process, the managed application 603 resets the inactivity timer at steps 809 and 812 following read/write activity in steps 807, 808, 810, and 811.

FIG. 9 depicts an example process flow illustrating a lock process based on inactivity in accordance with one or more illustrative aspects discussed herein.

As illustrated in FIG. 9, the managed application 603 may attempt to use the SSO key stored in application specific storage to access the shared vault, similarly to the process illustrated in FIG. 8. At step 901 the managed application 603 may read the SSO key from application specific, isolated storage. At step 902, the managed application 603 may access the shared memory 605 to retrieve the second vault key record (i.e. the SSO key-encrypted vault key) and may generate a copy of the vault key by decrypting the second vault key record. At step 903, the managed application 603 may unlock the vault database using the generated copy of the vault key and access data stored therein. At step 904, the managed application 603 may read an inactivity timer stored in the vault database and, at step 905, check whether the inactivity timer has expired. In the illustrated process of FIG. 9, the managed application 603 may determine that the inactivity timer has expired. As the inactivity timer has expired (and/or when other inactivity criteria have been met), the managed application 603 may "lock" the shared vault by deleting the SSO-key-encrypted vault key at step 906. As a result, the shared vault database may be locked as to all managed applications 602, 603, and 604 that have registered with the shared vault. The stored SSO key may no longer be used to access the shared vault until user entropy is received and used to re-create the SSO-key-encrypted vault key. At step 907, the managed application 603 may prompt the user to enter user entropy and, at steps 908 and 909, the managed application 603 may unlock the shared vault as described previously and reset the inactivity timer at step 910. After the managed application 603 unlocks the shared vault, other registered applications will be able to use their previously stored SSO keys to access the shared vault without interruption (until another inactivity event occurs). As illustrated, the managed application 603 may read and write both common secrets and application secrets in steps 911, 912, 914, and 915, and the inactivity timer may be reset each time the shared vault is accessed in steps 913 and 916.

FIG. 10A depicts an example process flow illustrating the operation of multiple applications during a lock process based on inactivity in accordance with one or more illustrative aspects discussed herein.

As illustrated in FIG. 10A, the shared vault may be locked by any managed application based on the inactivity timer. When the shared vault is locked, such as by the master application 602, other registered applications (e.g. managed application 603) are also prevented from accessing the shared vault using the SSO key stored in their respective application-specific memories. However, any application may prompt the user to provide user entropy and unlock the shared vault. In the example illustrated in FIG. 10A, the master application 602 locks the shared vault based on the inactivity timer but it is a managed application 603 that prompts the user to enter user entropy and unlocks the shared vault for all other registered applications.

In particular at step 1001 the master application 602 may read the SSO key from application specific, isolated storage. At step 1002, the master application 602 may access the shared memory 605 to retrieve the second vault key record (i.e. the SSO key-encrypted vault key) and may generate a copy of the vault key by decrypting the second vault key record. At step 1003, the master application 602 may unlock the vault database using the generated copy of the vault key and access data stored therein. At step 1004, the master application 602 may read an inactivity timer stored in the vault database and, at step 1005, check whether the inactivity timer has expired. In the illustrated process of FIG. 10A, the master application 602 may determine that the inactivity timer has expired. As the inactivity timer has expired (and/or when other inactivity criteria have been met), the master application 602 may "lock" the shared vault by deleting the SSO-key-encrypted vault key at step 1006. As a result, the shared vault database may be locked as to all managed applications 602, 603, and 604 that have registered with the shared vault. The stored SSO key may no longer be used to access the shared vault until user entropy is received and used to re-create the SSO-key-encrypted vault key.

Though the master application 602 has deleted the second vault key record, thereby locking the vault, other applications such as managed application 603 may have previously unlocked the vault and stored the SSO key. Because the second vault key record was deleted, the other application 603 may be required to prompt the user to re-enter user entropy at step 1007. At steps 1008 and 1009, the managed application 603 may unlock the shared vault as described previously and reset the inactivity timer at step 1010. After the managed application 603 unlocks the shared vault, other registered applications will be able to use their previously stored SSO keys to access the shared vault without interruption (until another inactivity event occurs). As illustrated, the managed application 603 may read and write both common secrets and application secrets in steps 1011, 1012, 1014, and 1015, and the inactivity timer may be reset each time the shared vault is accessed in steps 1013 and 1016.

In some embodiments, an app that remains in memory (e.g. in a suspended state, or a background state) rather than being closed may still have data encryption (S1, S2) keys stored in application specific memory. In such a case, there may be no need for the application to unlock the vault. For example, a managed mail app could still sync e-mails while in the background. However, when the app is removed from memory and started fresh, the vault may need to be unlocked if not already unlocked by another app. If the app is explicitly launched by the user, then the full authentication UI can be shown.

One issue may be where an app is launched fresh in the background by the OS scheduler or notification service and the vault is in a locked state. A background launch by the OS scheduler or notification service could occur following a device reboot or where the app is removed from memory after being suspended due to the need to free up resources for other apps. In this case the app may not be able to show a full in-app authentication UI for user entropy while in the background and thus may be unable to unlock the vault. For example, an email application launched by a notification service may be unable to sync its mails in the background. One way to resolve this issue is that an application can issue a local device notification informing the user to take action by launching the app. This notification may show in the device notification area, e.g. in the upper portion of the device screen. For example: "WorxMail requires attention".

Figure 10B:
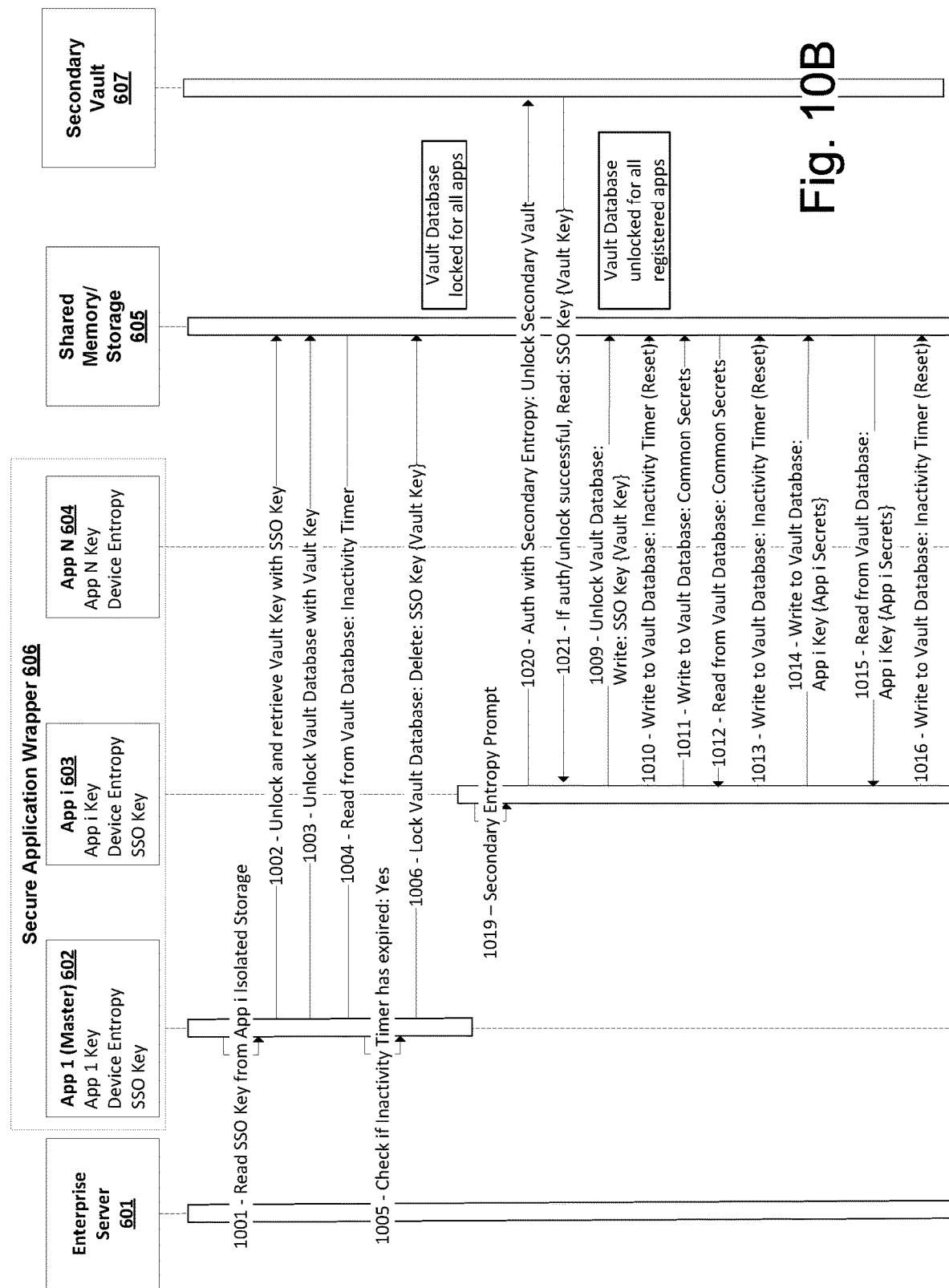
FIG. 10B depicts another example process flow illustrating a lock process based on inactivity in accordance with one or more illustrative aspects discussed herein.

FIG. 10B illustrates a vault unlock process and the operation of multiple applications in an embodiment incorporating a secondary vault 607. If the secondary vault (e.g. Touch ID) is enabled and the vault needs to be unlocked, for example due to expiration of the inactivity timer, the SSO record may be obtained by challenging the user for the secondary entropy. The secondary entropy may be used to retrieve the SSO record from the secured container (e.g. a Touch ID-protected keychain).

In particular, processing in FIG. 10B may proceed similarly to that illustrated in FIG. 10A in steps 1001 through 1006. However, the managed application 603 may allow the user to enter his passcode as in step 1007 of FIG. 10A or, alternatively, enter his secondary entropy in step 1019. For example, the user may be prompted to either enter his PIN (primary entropy) or touch a fingerprint reader (secondary entropy). If the user enters his PIN, then processing proceeds as discussed in FIG. 10A and the secondary vault need not be accessed. If the user inputs his secondary entropy, at step 1020 the managed application 603 authenticates with the secondary vault 607 using the secondary entropy. In some embodiments, the secondary vault 607 may be managed by the operating system and managed application 603 may utilize one or more APIs to cause the system to prompt the user for secondary entropy and unlock the secondary vault 607. At step 1021, the managed application 603 may read the instance of the second vault key record (the SSO key-encrypted vault key) stored in the secondary vault and then may unlock the vault stored in the shared memory 605 in step 1009, as described above. Having unlocked the shared vault using the second vault key record stored in the secondary vault 607, the system may read and write secrets to the vault and reset the inactivity timer, as described above.

Figure 10C:
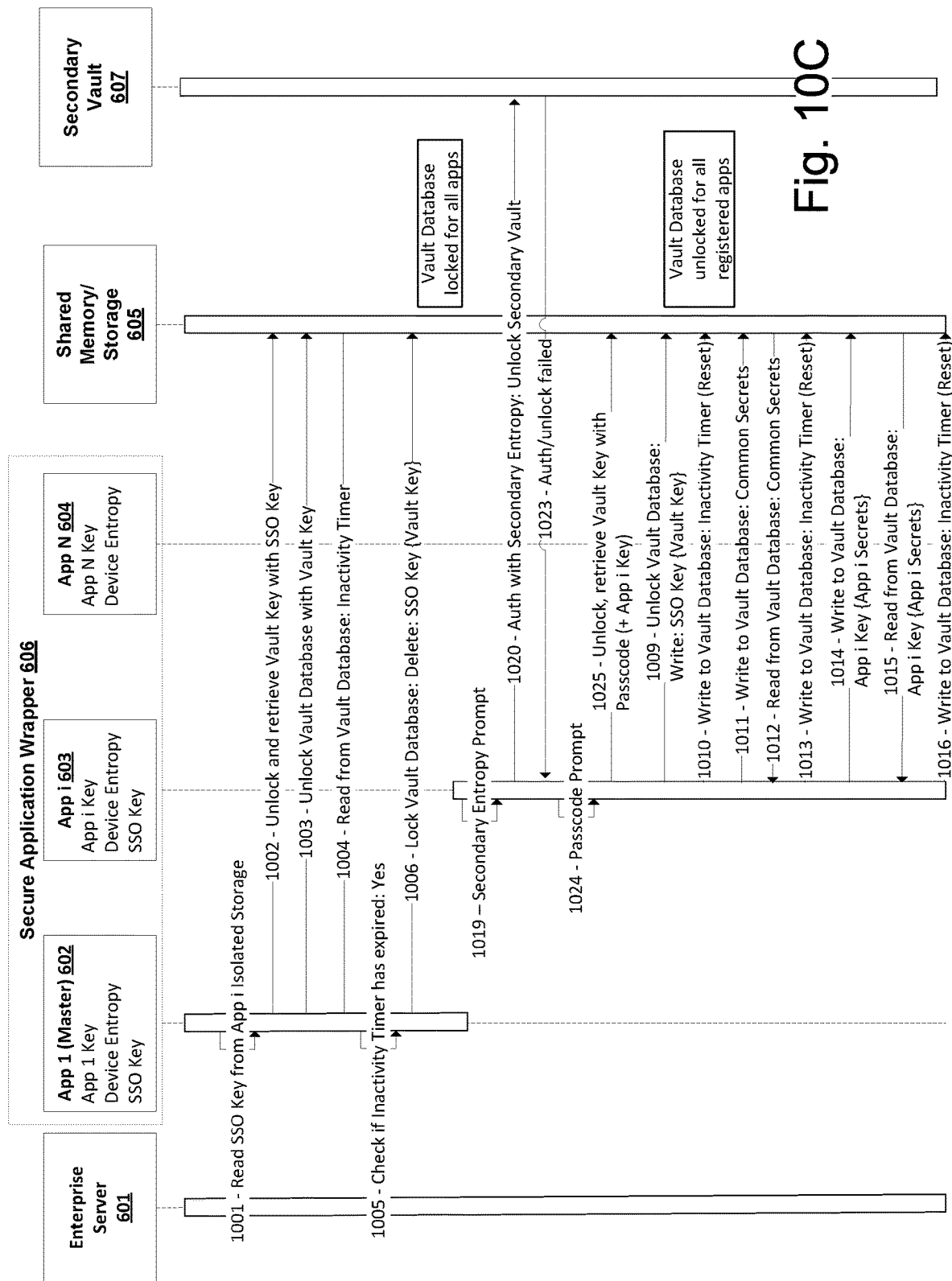
FIG. 10C depicts another example process flow illustrating a lock process based on inactivity in accordance with one or more illustrative aspects discussed herein.

FIG. 10C illustrates an example processing flow wherein the system provides a fallback means to unlock the shared vault in case unlocking of the secondary vault fails. In some embodiments, the system may provide fallback means to allow the user other methods to access data where secondary entropy fails. For example, if the system has trouble reading the user's fingerprint, the system may prompt the user to enter a device passcode (which may be distinct from the user entropy passcode that is used to decrypt the shared vault). For example, on the iOS platform a fallback from Touch ID prompt to device passcode prompt may occur. If the user is able to provide the device passcode, the system may unlock the secondary vault and provide access to the second vault key record. In other implementations, which may be preferred depending on operating conditions, the secure application wrapper 606 and/or the managed application 603 may prevent the system from employing a fallback to the device passcode and may instead require that the user input the passcode used to encrypt the vault. This may be beneficial in embodiments where the strength (length and complexity) of the device passcode cannot be guaranteed, while the strength policy requirements of the user entropy passcode used to protect the shared vault may be managed by the enterprise server 601 and enforced by master application 602.

In particular, processing in FIG. 10C may proceed similarly to that illustrated in FIG. 10B in steps 1001 through 1020. However, as illustrated in FIG. 10C the authentication with the secondary vault may fail in step 1023. At step 1024, the managed application 603 may notify the user that secondary entropy failed and prompt the user to input his passcode (primary entropy) to unlock the shared vault. At step 1025, the managed application 603 may unlock the shared vault by generating a copy of the vault key using the passcode (and, in the illustrated embodiment, application entropy). In particular, as previously described, to generate a copy of the vault key the managed application 603 may use a first vault key record, which may be a user-entropy encrypted vault key record or passcode encrypted vault key record 432, or, in the illustrated embodiment, one of a plurality of per-app vault key records 434 which may be encrypted using the user entropy (passcode) in combination with application specific entropy for application 603. Then, similar to FIG. 10B, at step 1009 the system may unlock the vault database for all registered managed applications by generating and writing a SSO key encrypted vault key record into the vault record keeping section. The system may read and write secrets to the vault and reset the inactivity timer, as described above.

FIG. 11A depicts an example process flow illustrating a PIN update process in accordance with one or more illustrative aspects discussed herein.

As illustrated in FIG. 11A, the master application 602 may allow a user to change his PIN or other user entropy. At step 1101, the master application 602 may prompt the user to provide his old PIN. At step 1102, the master application 602 may read the PIN validator associated with the current/old passcode and, at step 1103, validate the old PIN before allowing the user to change his PIN. The master application 602 may receive the new PIN at step 1104. At step 1105, the master application 602 may generate a new PIN validator and, at step 1106, update the shared vault 605 with the new PIN validator. At step 1107, the master application 602 may unlock the vault by decrypting the first vault key record (i.e. the passcode-encrypted vault key record) using the old PIN (and, in the illustrated embodiment, application entropy). And, in the illustrated embodiment, the master application 602 may generate a newly encrypted vault key record for each installed application and, at step 1108, write the newly generated new-PIN-encrypted vault keys to the shared memory 605. As previously discussed, the vault key record for each application may be further encrypted using application entropy and the user entropy. In other embodiments, a single newly encrypted vault key record may be created, encrypted with the new user entropy.

In some embodiments, in case the user has forgotten his old PIN, the master application 602 may require the user to re-enroll with the server using strong authentication and recreate the entire shared vault. Recreating the entire shared vault may result in the user losing common and application specific assets, which may be disruptive to user experience. In other embodiments, as illustrated in FIG. 11B, in case the user has forgotten his old PIN or after a policy-defined limit of unsuccessful PIN entries has been reached in step 1109, the master application 602 may restore the shared vault from enterprise server 601. The master application 602 may prompt the user for strong authentication (such as Active Directory (AD) password or two factor authentication). At step 1110, the master application 602 may authenticate the user to the server. At step 1111, the master application 602 may recover the vault key previously generated by and cached at the server by requesting the vault key. The enterprise server 601 may retrieve a stored copy of the vault key at step 1112 and may provide the stored vault key to master application at step 1113. At step 1114, master application 602 may prompt the user to set up a new PIN. At steps 1115-1117, the master application may update the shared vault with the new PIN as previously discussed with respect to steps 1105, 1106 and 1108 of FIG. 11A, without disrupting the user experience.

In some embodiments a password, such as an Active Directory (AD) password, may be used as user entropy. One potential advantage of using an AD password may be that a user may not have to set up a separate passcode to be used as user entropy on his devices. In other embodiments, as previously discussed, a PIN may be used which is distinct from the user's AD password. One advantage of a separate PIN may be that it may not be stored on a server and might not be used by other systems or devices thus diminishing the potential attack surface. A separate PIN may also have different strength (length and complexity) policy requirements set by administrator. An administrator may allow a user to setup a simpler PIN that is easier to remember than a long alphanumeric AD password. Embodiments where AD passwords are used for user entropy may present unique challenges. A user's AD password may be changed with an AD service after the user logs in from any of his devices to an authorized application or service. If the AD password is also used as user entropy on an enrolled user device, then the need may arise to synchronize the password update with the vault on that device.

In some embodiments, as illustrated in FIG. 11C, the enterprise server 601 may be notified of changes to the user's active directory password and update the shared vault accordingly. In particular, at step 1120 the enterprise server 601 may register with an active directory service 611 to receive event notifications for user password changes. At step 1121, a user may log in from any of his devices to an authorized application or service and complete an AD password change. At step 1122a, the AD service 611 may then issue a notification of password change to the enterprise server 601. At step 1122b, the enterprise server 601 may forward the notification to the master application 602 enrolled by the user. At step 1123, the master application 602 may than invalidate the old password validator to prevent the old password from being used to unlock the shared vault stored in shared memory 605. At step 1124, the master application 602 may prompt the user for strong authentication such as Active Directory (AD) password or two factor authentication and, at step 1125, authenticate the user to the enterprise server 601. At step 1126, the master application 602 may recover the vault key previously generated by and cached at the server by requesting the vault key. The enterprise server 601 may retrieve a stored copy of the vault key at step 1127 and may provide the stored vault key to master application at step 1128. At step 1129, master application 602 may create a new password validator for the changed active directory password. At steps 1130 and 1131, the master application 602 may update the shared vault with the new password as previously discussed with respect to steps 1106 and 1108 of FIG. 11A.

As described previously herein, some embodiments may provide different policies and modes based on security and user experience preferences. Different policy types may be stored in different parts of the shared vault, in some embodiments. For example, global policies may be stored in the common shared secrets section of the shared vault. Per-app policies may be stored in the application-specific storage associated with the respective application. Per-security group policies may be stored in the application-specific storage of each respective application included in the security group. Synchronization issues with per-security group policies may be addressed using a flag in the shared secrets stored in the shared vault, in some embodiments.

Figure 12A:
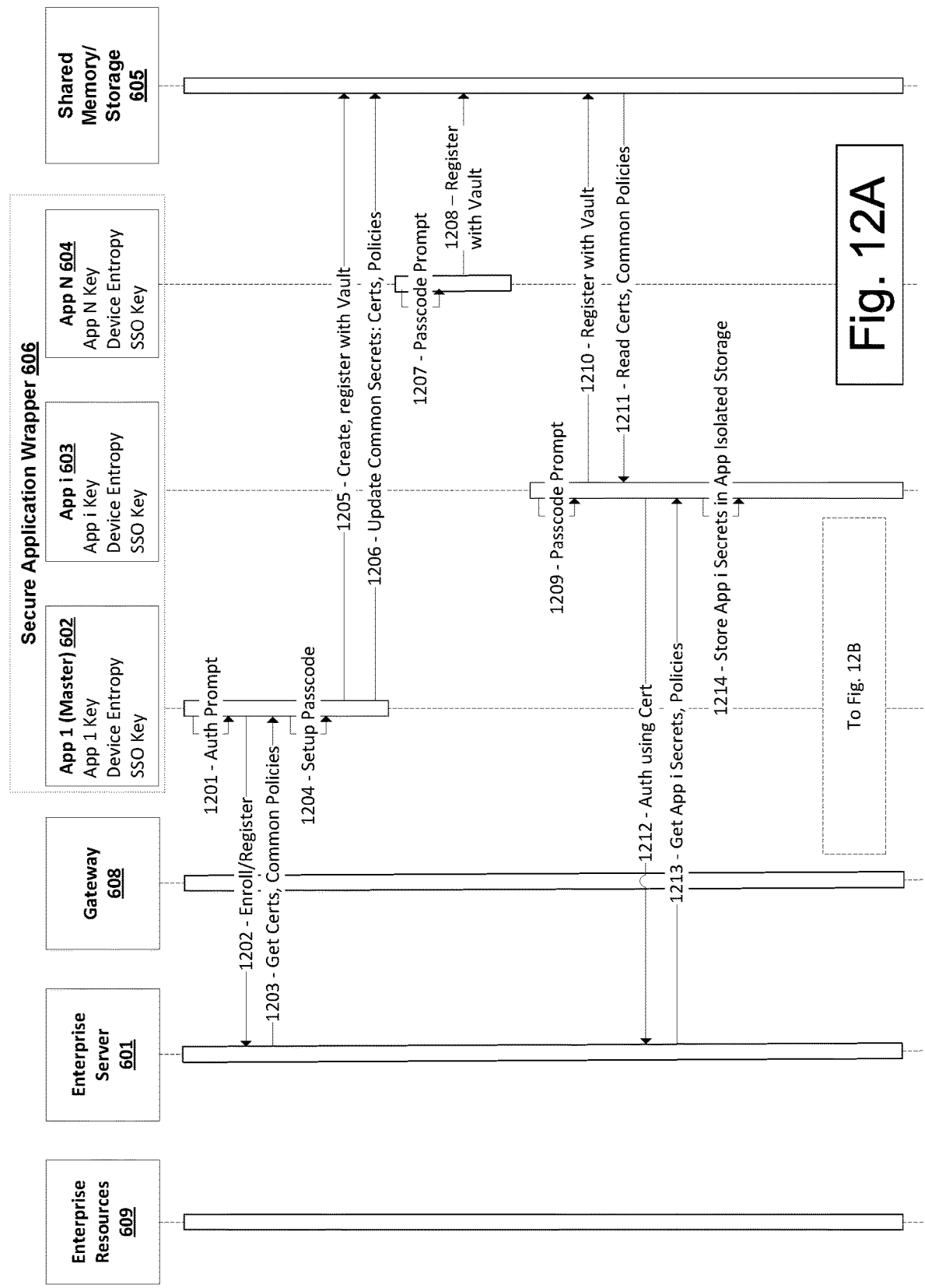

FIGS. 12A and 12B depict an example process flow illustrating a distributed authentication process in accordance with one or more illustrative aspects discussed herein.

As illustrated in FIG. 12A, some embodiments of the shared vault described herein may allow for distributed authentication where managed applications can effectively share authentication state through shared access gateway ticket, certificates, SAML tokens, VPN stack information, and the like. As in FIG. 6A, FIG. 6B and FIG. 6C, a master application may create the shared vault and update the shared secrets to include certificates and shared/common policies. One or more applications may prompt the user to input user entropy and the applications may register with the shared vault. Once registered, an application (such as App i as illustrated) may utilize the certificates stored in the shared vault to authenticate and retrieve data from one or more enterprise servers and resources, such as application-specific secrets.

In particular, at step 1201 the master application 602 may prompt a user to provide strong authentication. Using the strong authentication, at step 1202 the master application may enroll with an enterprise server 601 and register the device within the managed framework. At step 1203 the enterprise server 601 may provide the master application 602 with relevant certificates, policies, and the like for use in creating the shared secret vault and enabling its use on the device. At step 1204 the master application 602 may prompt the user to set up a passcode or other user entropy to be used in securing the shared vault. At step 1205 the master application 602 may create the shared secret vault and store the SSO key to unlock the vault. In some embodiments, the enterprise server 601 may provide a vault key to the master application 602 for use in creating the shared secret vault. In other embodiments, the master application 602 may generated the vault key itself. At step 1206, the master application 602 may update the shared vault to include the certificates, policies, and other data received from the enterprise server 601 for shared access by other managed applications. At step 1207, managed application 604 may prompt the user to input his passcode and, at step 1208, register with the vault. At step 1209, another managed application 603 may prompt the user for his passcode and, at step 1210, register with the vault. Managed application 603 may, at step 1211, read the certificates and common policies stored in shared memory 605 having decrypted the vault using the user's passcode and/or at subsequent times using the SSO key. Managed application 603 may authenticate with enterprise server 601 using the certificates stored in the shared vault at step 1212. At step 1213, enterprise server 601 may provide managed application 603 with application specific secrets and policies. At step 1214, managed application 603 may store the application-specific secrets in application-specific storage. In some embodiments, the application-specific secrets may be stored in system memory isolated for use by the respective application. In other embodiments, the system may store the application-specific secrets in a portion of the shared vault in the shared memory 605 but encrypted using application entropy known to the respective application.

FIG. 12A continues as FIG. 12B, where one application completes higher assurance authentication and retrieves a long-lived access gateway ticket to access enterprise resources. This ticket may be made available to other registered applications.

As illustrated in FIG. 12B, a managed application 603 may prompt the user to provide authentication credentials other than the passcode used to unlock the shared vault at step 1215. At step 1216, the managed application 603 may execute a higher assurance authentication procedure with gateway 608 and, at step 1217, retrieve a gateway ticket allowing the application to access enterprise resources. The managed application may store the gateway ticket in the shared vault at step 1218. The managed application 603 may use the ticket to access enterprise resource 609 via gateway 608 at steps 1220 and 1221. Another managed application 604 registered with the shared vault may access the gateway ticket at step 1222, update its authentication state at step 1223, and use the shared gateway ticket it to access enterprise resources 609 via gateway 608 as well at steps 1224 and 1225. As a result, a managed application may be able to provide users with enterprise resources requiring authentication without prompting the user to re-enter authentication information already provided in another managed application.

In some embodiments, distributed authentication may be provided by building or wrapping-in an authentication manager instance in the context of each line of business/mobile application management app. The authentication manager may be designed using layers, for example. One layer may handle user interface callbacks for authentication prompts and notifications. Another layer may provide core authentication state management. Another layer may provide state marshalling in and out of the secret vault's shared storage. Yet another layer may provide network communications. This design may ensure that there will be no additional authentication prompts for a given server resource unless the server resource expires. As a further user experience, in some embodiments the authentication UI may be built or wrapped into the context of each line of business/mobile application management application, so that even when a server resource expires, authentication can be done in the currently used application rather than requiring a flip to a master application such as WorxHome. As a result, in some embodiments, the master application may be completely removed or used only for limited purposes, e.g. enrollment, app store, technical support, and the like. In some embodiments, some managed applications incorporate embedded authentication user interfaces while others rely on a master application.

Distributed authentication using a shared vault in accordance with one or more aspects described herein may provide a base or platform for additional features. For example, some embodiments may provide independent and silent policy refresh from each application. Other embodiments may provide step-up authentication on a per-app-basis or group of apps-basis based on policy. In some systems, a separate gateway has to be set up, for example with multi-factor authentication, and all applications have to be elevated to the stricter authentication. Still other embodiments may provide multiple micro-VPNs on a per-app- or group of apps-basis based on policy.

Other embodiments may provide support for multiple users on a shared device. As described previously herein, the device may include more than one shared vault. The device may include a shared vault for each user of the device, and individual applications may be registered with shared vaults for more than one user. The entire managed framework on the device could adapt to a change in user indicated by a new passcode or other information indicating that a user switch has occurred. For example, the shared vault for a first user may be active while the first user is using the device and has entered his passcode. The user may hand off the device to a second user who may enter her passcode. The first user may have indicated to the system that he intended to log off. Additionally and/or alternatively, the device may detect that a different user's passcode has been entered and may initiate a context switch to shift to the appropriate shared vault associated with the new user. The device may require additional authentication information beyond the passcode in order to provide additional protections. As one example implementation, multiple shared secret vaults may be provided on a mobile device used in a hospital and shared by doctors and nurses. Applications on the device may register with one or more shared vaults and shift context based on the passcode associated with a current user.

Still other embodiments may support business-to-consumer use cases where businesses seek to provide secured information to their customers using independent mobile applications. Some embodiments may allow for application management independent of a single master application and may be more acceptable to customers and end-users.

Some embodiments may provide for virtual smart cards, according to one or more aspects described herein. On some platforms, such as devices running the Windows Phone operating system, a Trusted Platform Module (TPM) can be used for virtual smart card implementation. On other platforms, such as devices running the iOS and Android operating systems, a virtual TPM can be built as part of the shared secret vault. Virtual smart card implementations may incorporate additional security features to protect a PIN-encrypted smart card stored in the shared vault. These additional security features may provide tamper protection and code obfuscation, ensure that the VSC cannot be cloned (e.g., through use of strong device entropy for encryption), provide a robust enrollment scheme, and block access to the device after a number of unsuccessful access attempts. Blocking features may be coupled with strong unlock solutions so as to provide minimal user experience impact to legitimate users.

Virtual smart cards, according to some embodiments, may provide the benefits of smart cards without requiring smart card hardware (readers, cards) and software (cryptographic service provider [CSP]) installations. Some embodiments described herein may enable virtual smart cards for platforms that do not have hardware support and customers that are willing to accept lower security limits (such as use of virtual TPM, card data stored in OS memory). Some embodiments may provide improved granularity of authentication (such as per app or group of apps), security and user experience. However, in some embodiments, virtual smart cards may be limited to online authentication use cases as virtual smart card authentication may be to a server rather than the device itself (since the device "is" the smart card, in some embodiments).

As described above, embodiments of one or more aspects described herein may be implemented on devices running any suitable operating system. For example, an iOS device may utilize the Pasteboard, I/O Surface (GPU memory), or System Log data structures in implementing the shared vault. As another example, an Android device may utilize a service in a master application such as WorxHome via activities and utilize certificates to ascertain calling app authenticity to implement one or more aspects described herein. On Windows Phone devices, the device may utilize shared file(s) in a photo library directory to implement a shared vault. In Windows 8.1 (WinRT) devices, a local host loop-back for line of business applications may be used. In another embodiment, a Windows 8.1 device may utilize a service configurable via mobile device management frameworks and/or a service that may be shared with desktop applications. Sharing data with desktop applications may provide additional benefits, such as use of physical smartcards. In another embodiment, a Windows 10 device may utilize an application service in a master application such as WorxHome to implement one or more aspects described herein.

In an example embodiment on an iOS device, the shared vault may be implemented using a Pasteboard data structure. The iOS operating system provides two types of Pasteboards that may be used in an example embodiment: UIPasteboardNameGeneral, which is persistent but may be accidentally wiped by other applications; and UIPasteboardNameFind, which is persistent and unlikely to be accidentally wiped by other applications. Embodiments may also utilize a shared I/O Surface (in GPU Memory). This data structure is volatile and may be utilized freely by applications without entitlement. The lifetime of this data structure may be controlled using a deliberate leak. Another iOS data structure that may be used is the System Log, which supports custom binary data types. In another example embodiment on an iOS device, the shared vault may be implemented in a key-chain protected named pasteboard, access to which is limited to applications signed by the same user profile. Each of these data structures provides a non-limiting example of how some embodiments may be implemented.

Although FIG. 2 illustrates the shared vault 210 as stored on the mobile device 200, some embodiments may store all or part of the shared vault online. While this may suffer from latency and reliability problems, it may be a useful option on client platforms that do not provide access to shared persistent storage or shared volatile storage. In addition, on some client OSs, and in some embodiments, the online option may also be useful as a compliment to a local implementation. An online shared vault may provide a seamless restore point for vault management records and common assets without requiring explicit re-authentication or a flip to a master app. For example, on some client OSs, the shared vault may be accidentally wiped out by another app (e.g., if the general copy/paste pasteboard on iOS is used to provide the shared vault). On some client OSs, only volatile shared memory may be available and following device reboot the vault management records and common assets may be lost and may need to be recreated.

According to some aspects described herein, storing all of the shared vault or portions of the shared vault online may support several additional features. In some embodiments, the user's passcode may be stored online while the shared vault remains stored locally. In some embodiments, the shared vault may be stored at a web server on a server pasteboard data structure. In some embodiments, the shared vault may be implemented in a split storage mode (as shown in FIG. 5) and vault management records and shared secrets may be stored on the server while application specific secrets may be stored locally. In other embodiments, the server may store a copy of the shared vault as a cached restore point. The device may still store the shared vault locally, but updates made to the local shared vault may be duplicated on the server and the server's copy may be used to restore the shared vault locally if it is lost or removed.

In some embodiments, as briefly described above, the server may store the user's passcode while the shared vault remains locally stored on the device. One example embodiment may use a company-wide, globally available, pasteboard service to share the user entropy (passcode) between all managed applications within a secure application wrapper. The vault itself may remain implemented locally on the device.

FIG. 13 depicts an example process flow illustrating a vault creation process on a web server in accordance with one or more illustrative aspects discussed herein. During first time use, an asymmetric key-pair may be created: DPUB and DPRIV. The key-pair may be made available to all applications within the secure application wrapper 606. In some embodiments, the server, such as enterprise server 601, may create keys and embed them in applications at wrapping time. However, this embodiment may be reversible if the application is hacked. In other embodiments, the server may create keys and embed them in applications in real-time upon user deployment. This embodiment may provide additional security. In still other embodiments, a master application on the mobile device may create keys and hand them off to other managed apps during first time use over secure IPC. This may be viable on platforms that have secure IPC, such as Windows Phone devices. In other embodiments, a master app (or first managed app) 1310 on a mobile device may create keys and share them securely with other mobile apps using app registration model and local shared vault.

In some embodiments, at step 1331 the master app or first managed app 1310 on the device may authenticate with an organization pasteboard service 610 using the end-user's credentials and may request a unique pasteboard GUID (e.g. a URL) by registering a new device public key, DPUB. Assuming HTTP CRUD conventions an HTTP POST can complete this step. The DPUB key may be posted to a web handler 1321 of the pasteboard service 610. At step 1332, the web handler 1321 may save the public key DPUB to persistent store 1322 and retrieve a unique GUID for a persistent pasteboard for use by application 1310 (and other managed applications). The pasteboard service 610 may generate the unique GUID (URL) for the managed applications and the GUID may be retrieved by the web handler 1321 in step 1333. At step 1334, the web handler 1321 may return this unique location in response to application 1310 (for example, "https://my.org/mdxpasteboard/{GUID}"). The managed apps on the device may now use this location to store and share encrypted data.

FIG. 14 depicts an example process flow illustrating a passcode retrieval process in accordance with one or more illustrative aspects discussed herein. In some embodiments, a managed application may perform the illustrated steps to share the user entropy (passcode information) with other managed applications. At step 1401, a first managed application 1310 may encrypt the user entropy (passcode) with DPUB and send the result along with DPUB to the central pasteboard service 610. The first managed application 1310 may encrypt the passcode with the public key, thereby generating DPUB{passcode}. The first managed application 1310 may create a payload comprised of the public key and the encrypted passcode, [DPUB, DPUB{passcode}]. The first managed application 1310 may upload the payload to the web handler 1321 of the pasteboard service 610. At step 1402, the pasteboard service 610 may store a GUID and the payload (e.g., the public key and the encrypted user entropy) in persistent store 1322. In some embodiments, on first time use the pasteboard service can check to ensure that the public key, DPUB, matches the key that was registered during pasteboard creation. At steps 1403 and 1404, the pasteboard service 610 may generate an acknowledgement message and sent the message to application 1310.

For a second application 1313 to retrieve the user entropy (passcode), the second application 1313 may be required to prove possession of the private key, DPRIV, to the pasteboard service 610. The second managed application 1313 may attempt to request the encrypted user entropy (passcode) from the pasteboard service at step 1405 using the GUID. The pasteboard service 610 may challenge the second managed application to prove possession of DPRIV through a challenge (nonce) encrypted by DPUB. In step 1406, the web handler 1321 may request the challenge for the particular GUID used to access the pasteboard service 610. At step 1407, the pasteboard service 610 may generate the challenge (nonce) encrypted with DPUB. At steps 1408 and 1409 the pasteboard service 610 provides the challenge to second managed application 1313 via web handler 1321. At step 1410, the second managed application 1313 may decrypt the challenge using DPRIV, transform it, then re-encrypt it using DPRIV. At step 1411, the second managed application 1313 may send the challenge-response to the pasteboard service 610. The pasteboard service 610 may decrypt the challenge-response and verify the transform on the challenge (nonce) at steps 1412 and 1413. If the challenge-response is successful the pasteboard service 610 may send the encrypted user entropy to the second managed application at steps 1414 and 1415 via web handler 1321. The second managed application 1313 may then decrypt the passcode and gain access to the shared vault without prompting the user at step 1416.

FIG. 15 depicts an example process flow illustrating a passcode update process in accordance with one or more illustrative aspects discussed herein. To update the passcode, in some embodiments, a managed application 1310 may issue a request to update the encrypted passcode at step 1501. The pasteboard service 610 may challenge the managed application 1310 to prove possession of DPRIV through a challenge (nonce) encrypted by DPUB. In step 1502, the web handler 1321 may request the challenge for the particular GUID used to access the pasteboard service 610. At step 1503, the pasteboard service 610 may generate the challenge (nonce) encrypted with DPUB. At steps 1504 and 1505, the pasteboard service 610 provides the challenge to managed application 1310 via web handler 1321. At step 1506, the managed application 1310 may decrypt the challenge using DPRIV, transform it, then re-encrypt it using DPRIV. At step 1507, the managed application 1310 may send the challenge-response to the pasteboard service and the updated encrypted new user entropy (passcode), DPUB{New-passcode}. The pasteboard service 610 may decrypt the challenge-response and verify the transform on the challenge (nonce) at steps 1508 and 1509. If the challenge-response succeeds the pasteboard service may update the user entropy (passcode) corresponding to the specific GUID that was updated. At steps 1510 and 1511, the pasteboard service may send an acknowledgement message to the managed application 1310.

Such an arrangement (storing user passcode at the server) may provide for sharing of user entropy between applications without prompting the end user, in some embodiments. The offline failback may be simple as it will prompt the user for his passcode. However, such an online arrangement may suffer from typical problems such as latency issues and unavailability of network resources. Further, the online pasteboard may provide another avenue for attackers. To prevent this, the server may require another layer of authentication to access the pasteboard.

As described briefly above, some embodiments may store the shared vault at the server. This design alternative may be similar to the local vault design, except that the shared vault is stored on a server pasteboard as shared storage. The management of the server pasteboard is similar to that described in the previous section. The pasteboard creation step may be the same. At the end of a first time use, a managed application may have a pasteboard URL that may be used to store data. However, in this variation the data stored by the pasteboard may be the device public key and the shared secret vault. All other operations are similar to those described above and will not be repeated here. Such an arrangement may be useful on client OSs where no local shared storage (persistent or volatile) is available. On client OSs where only volatile shared memory may be available, sensitive information stored in the shared vault at the server may persist across device reboots. This may avoid a single flip to a master app to restore from an in-app cache.

As described briefly above, some embodiments may utilize split storage and store some portions of the shared vault on the server and other (or overlapping portions) locally. This may be done using a similar design to the local split-storage implementation (illustrated in FIG. 5) but may store vault management records and common assets on the server. Application-specific assets may be stored in application-isolated storage on the client device. Such an arrangement may be useful on client OSs where neither persistent nor volatile local shared storage is available. On client OSs where only volatile shared memory is available, sensitive information stored in the vault at the server may persist across device reboots. This may avoid a single flip to a master app to restore from in-app cache. Further, this may provide offline access to application-specific assets by prompting the user to enter user entropy.

As a variation on embodiments using split storage with server storage, in some embodiments the common assets may be cached on the server, while the vault record keeping entries may be stored in local shared memory. The vault record keeping entries may still be restored from the master app (e.g., WorxHome/Receiver) or a managed app that initially created the shared vault. Shared vault restoration from the server cache may require the device to be online but the common assets are generally useful for server access and therefore restoring them when the device is online may not have a significant negative impact on user experience but may improve security.

As described briefly above, still further embodiments may utilize the server to provide a cache and restore point for the shared vault. This may be done using a similar design to the local split-storage implementation (illustrated in FIG. 5), but writes to the vault management records and common assets may also be duplicated to the server as a dual cache, when available (online). An off-line device may continue to update a local cached copy of the vault without updating the pasteboard server copy of the vault. Such an arrangement may be useful to provide a seamless restore point on client OSs where local persistent shared storage is available but may be accidentally wiped by another app. It may also be useful where only volatile shared memory is available. Through use of the server cache, sensitive information stored in the shared vault may be restored after the device reboots.

In still further embodiments the type and location of shared memory used for the implementation of parts of the shared vault may be controlled through policy.

As a result of one or more aspects discussed above, mobile device applications may provide single sign on features through use of a shared vault. A user may be initially prompted to provide a passcode or other user entropy the first time he uses an application, but thereafter the application may have access to enterprise resources without further prompting the user to provide his passcode. Further, as a result of one or more aspects discussed above, an application that has registered with the shared vault may access shared secrets and may be able to access enterprise resources requiring initial authentication without further interrupting the user to provide user entropy or enterprise authentication credentials. According to one or more aspects discussed above, some embodiments may avoid or minimize application context switches ("flips") between mobile apps while still keeping applications in sync. Some embodiments may avoid reliance on a single "master" application.

Further, some embodiments described above may support or provide a platform for virtual smart cards, per-application micro-VPNs, per-application step-up authentication, multiple users on a shared device, and business-to-consumer use cases with independent applications.

As illustrated above, various aspects of the disclosure relate to providing single sign on features using a shared vault, particularly where the shared vault is secured with user entropy, application entropy, and/or device entropy. One or more applications may register with the shared vault and may be provided with shared secrets such as access credentials without requiring further user entropy input by the user. Although the subject matter has been described in language specific to structural features and/or methodological acts, it is to be understood that the subject matter defined in the appended claims is not necessarily limited to the specific features or acts described above. Rather, the specific features and acts described above are described as some example implementations of the following claims.

What is claimed is:

1. A method comprising:
   generating, by a computing device, a shared vault comprising a vault database encrypted using a vault key;
   receiving, by a first application executing on the computing device, first user entropy from a user associated with the shared vault;
   decrypting, by the first application, a first vault key record using the first user entropy to generate a first copy of the vault key;
   decrypting, by the first application, the vault database using the first copy of the vault key;
   retrieving, by the first application, first network resource access credentials from a network service using user credentials associated with the user;
   writing, by the first application, the first network resource access credentials to the vault database;
   accessing, by a second application executing on the computing device and using second user entropy, the vault database to retrieve an unlock key by:
      receiving, by the second application, the second user entropy from the user associated with the shared vault;
      decrypting, by the second application, the first vault key record using the second user entropy to generate a third copy of the vault key;
      decrypting, by the second application, the vault database using the third copy of the vault key; and
      retrieving, by the second application, the unlock key from the vault database;
   decrypting, by the second application, a second vault key record using the unlock key to generate a second copy of the vault key, wherein a copy of the unlock key is stored in application memory associated with the second application; and
   accessing, by the second application and using the second copy of the vault key, the vault database to retrieve the first network resource access credentials.

2. The method of claim 1, wherein the first user entropy and the second user entropy each comprise a passcode corresponding to the user associated with the shared vault.

3. The method of claim 1, further comprising:
   accessing, by the second application, the network service using the first network resource access credentials.

4. The method of claim 1, wherein the first vault key record is stored in the shared vault.

5. The method of claim 1, wherein the second vault key record is stored in the shared vault.

6. The method of claim 1, wherein the vault database comprises:
   a shared portion accessible by a plurality of applications that have access to the shared vault, wherein the plurality of applications comprises the first application and the second application; and
   a first application portion accessible to the first application and encrypted using first application entropy associated with the first application.

7. The method of claim 5, further comprising:
   accessing, by the second application, an inactivity timer stored in the shared vault;
   determining, by the second application, whether the inactivity timer indicates that a pre-determined amount of time has elapsed since the vault database was last accessed; and
   in response to determining that the pre-determined amount of time has elapsed since the vault database was last accessed, deleting the second vault key record from the shared vault.

8. The method of claim 1, comprising:
   generating, by the first application, the second vault key record using the first copy of the vault key and the unlock key; and
   storing the second vault key record in the shared vault.

9. The method of claim 1, wherein the first vault key record is stored in the shared vault and is encrypted using a password associated with the user, and wherein the second vault key record is stored in a secured container that is secured using different user entropy, other than the password, associated with the user.

10. The method of claim 9, wherein the different user entropy comprises a personal identification number (PIN) associated with the user.

11. The method of claim 9, wherein decrypting, by the second application, the second vault key record using the unlock key to generate the second copy of the vault key comprises:
receiving, by the second application, the different user entropy; and
decrypting, by the second application, the second vault key record using the unlock key and the different user entropy to generate the second copy of the vault key.

12. A system comprising:
one or more processors;
memory;
a shared vault stored in the memory and comprising a vault record storage section and a vault database, wherein the vault database is encrypted using a vault key;
a first application stored in the memory and comprising first instructions that, when executed by the one or more processors, cause the system to:
receive, by the first application, first user entropy from a user associated with the shared vault;
decrypt, by the first application, a first vault key record using the first user entropy to generate a first copy of the vault key;
decrypt, by the first application, the vault database using the first copy of the vault key;
retrieve, by the first application, first network resource access credentials from a network service using user credentials associated with the user;
write, by the first application, the first network resource access credentials to the vault database; and
a second application, different from the first application, stored in the memory and comprising second instructions that, when executed by the one or more processors, cause the system to:
access, by the second application and using second user entropy, the vault database to retrieve an unlock key by causing the system to:
receive, by the second application, the second user entropy from the user associated with the shared vault;
decrypt, by the second application, the first vault key record using the second user entropy to generate a third copy of the vault key;
decrypt, by the second application, the vault database using the third copy of the vault key; and
retrieve, by the second application, the unlock key from the vault database;
decrypt, by the second application, a second vault key record using the unlock key to generate a second copy of the vault key, wherein a copy of the unlock key is stored in application memory associated with the second application; and
access, by the second application and using the second copy of the vault key, the vault database to retrieve the first network resource access credentials.

13. The system of claim 12, wherein the first instructions, when executed by the one or more processors, further cause the system to:
access, by the first application and using the first copy of the vault key, the vault database to retrieve the unlock key, wherein the unlock key is operable to decrypt the second vault key record associated with the shared vault to generate a copy of the vault key; and
store the unlock key in application memory associated with the first application.

14. The system of claim 12, wherein the first instructions, when executed by the one or more processors, further cause the system to:
generate, by the first application, the second vault key record using the first copy of the vault key and the unlock key; and
store the second vault key record in the shared vault.

15. The system of claim 12, wherein the first vault key record and second vault key record are stored in the shared vault.

16. One or more non-transitory computer readable media storing instructions that, when executed by one or more processors, cause a computing device to perform steps comprising:
generating a shared vault comprising a vault database encrypted using a vault key;
receiving, by a first application executing on the computing device, first user entropy from a user associated with the shared vault;
decrypting, by the first application, a first vault key record using the first user entropy to generate a first copy of the vault key;
decrypting, by the first application, the vault database using the first copy of the vault key;
retrieving, by the first application, first network resource access credentials from a network service using user credentials associated with the user;
writing, by the first application, the first network resource access credentials to the vault database;
accessing, by a second application executing on the computing device and using second user entropy, the vault database to retrieve an unlock key by:
receiving, by the second application, the second user entropy from the user associated with the shared vault;
decrypting, by the second application, the first vault key record using the second user entropy to generate a third copy of the vault key;
decrypting, by the second application, the vault database using the third copy of the vault key; and
retrieving, by the second application, the unlock key from the vault database;
decrypting, by the second application, a second vault key record using the unlock key to generate a second copy of the vault key, wherein a copy of the unlock key is stored in application memory associated with the second application; and
accessing, by the second application and using the second copy of the vault key, the vault database to retrieve the first network resource access credentials.

17. The computer readable media of claim 16, wherein the instructions cause the computing device to perform further steps comprising:
generating, by the first application, the second vault key record using the first copy of the vault key and the unlock key; and
storing the second vault key record in the shared vault.

18. The computer readable media of claim 16, wherein the first vault key record is stored in the shared vault and is encrypted using a password associated with the user, and wherein the second vault key record is stored in a secured container that is secured using different user entropy, other than the password, associated with the user.

19. The computer readable media of claim 18, wherein the instructions cause the computing device to perform the step of decrypting, by the second application, the second vault key record using the unlock key to generate the second copy of the vault key by causing the computing device to perform steps comprising:
  receiving, by the second application, the different user entropy; and
  decrypting, by the second application, the second vault key record using the unlock key and the different user entropy to generate the second copy of the vault key.

* * * * *